US012694381B2

(12) United States Patent
Sharma

(10) Patent No.: US 12,694,381 B2
(45) Date of Patent: Jul. 28, 2026

(54) SYSTEMS AND METHODS FOR INTERACTIVE VIDEO PRESENTATION OF TRANSACTIONAL INFORMATION

(71) Applicant: Paymentus Corporation, Charlotte, NC (US)

(72) Inventor: Dushyant Sharma, Waxhaw, NC (US)

(73) Assignee: PAYMENTUS CORPORATION, Charlotte, NC (US)

( * ) Notice: Subject to any disclaimer, the term of this patent is extended or adjusted under 35 U.S.C. 154(b) by 0 days.

(21) Appl. No.: 18/828,798

(22) Filed: Sep. 9, 2024

(65) Prior Publication Data

US 2025/0005546 A1     Jan. 2, 2025

Related U.S. Application Data

(63) Continuation of application No. 17/000,741, filed on Aug. 24, 2020, now Pat. No. 12,118,522.

(Continued)

(51) Int. Cl.
*G06Q 20/38*          (2012.01)
*G06F 9/451*          (2018.01)
(Continued)

(52) U.S. Cl.
CPC ......... *G06Q 20/102* (2013.01); *G06F 40/221* (2020.01); *G06F 40/284* (2020.01); *G06F 40/30* (2020.01); *G06Q 20/326* (2020.05)

(58) Field of Classification Search
CPC .... G06Q 20/102; G06Q 20/326; G06Q 20/14; G06Q 30/04; G06Q 20/00; G06Q 30/00;
(Continued)

(56) References Cited

U.S. PATENT DOCUMENTS

| 6,895,084 B1 * | 5/2005 | Saylor | H04M 15/56 |
| | | | 379/88.13 |
| 9,406,089 B2 * | 8/2016 | Mori | H04W 12/06 |

(Continued)

OTHER PUBLICATIONS

N. Indurkhya et al., eds., Handbook of Natural Language Processing, 2nd ed., 2010, Chapman & Hall/CRC Press/Taylor and Francis Group, Machine Learning & Pattern Recognition Series (Year: 2010).*

(Continued)

*Primary Examiner* — Douglas W Pinsky
(74) *Attorney, Agent, or Firm* — ALSTON & BIRD LLP

(57)          ABSTRACT

Methods, apparatuses, and computer program products are described for presenting an interactive audio-visual presentation of transaction documents. A method can include receiving a bill associated with a payor and payee, using a textual language processor or the like to identify content fields from the bill and assign markups and/or metadata to content fields, and using the content fields, markups, and/or metadata to generate an audio-visual presentation associated with the bill. This audio-visual presentation can be presented to the payor. The payee may then interact with the audio-visual presentation, for instance by verbal, visual, manual, or textual response. A verbal language processing engine, natural language processing engine, audio-visual language processing engine, or visual-manual language processing engine can be initiated to facilitate interpretation of the payee response and generate a further audio-visual presentation.

20 Claims, 6 Drawing Sheets

Related U.S. Application Data

(60) Provisional application No. 62/890,115, filed on Aug. 22, 2019.

(51) Int. Cl.

| | |
|---|---|
| *G06F 16/23* | (2019.01) |
| *G06F 21/53* | (2013.01) |
| *G06F 40/221* | (2020.01) |
| *G06F 40/284* | (2020.01) |
| *G06F 40/30* | (2020.01) |
| *G06Q 20/04* | (2012.01) |
| *G06Q 20/10* | (2012.01) |
| *G06Q 20/30* | (2012.01) |
| *G06Q 20/32* | (2012.01) |
| *G06Q 20/34* | (2012.01) |
| *G06Q 20/36* | (2012.01) |
| *G06Q 20/40* | (2012.01) |
| *G06Q 40/06* | (2012.01) |
| *G06T 7/10* | (2017.01) |
| *H04L 9/32* | (2006.01) |
| *H04L 29/06* | (2006.01) |
| *H04W 12/06* | (2021.01) |
| *H04W 12/08* | (2021.01) |
| *G06F 21/31* | (2013.01) |
| *G06F 21/32* | (2013.01) |
| *G06F 21/45* | (2013.01) |
| *G06F 21/57* | (2013.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(58) Field of Classification Search
CPC ........ G06Q 40/00; G06Q 40/02; G06Q 40/12; G06F 40/221; G06F 40/284; G06F 40/30; G06F 40/117; G07F 9/023; G07G 1/01; G10L 15/22
See application file for complete search history.

(56) References Cited

U.S. PATENT DOCUMENTS

| | | | | | |
|---|---|---|---|---|---|
| 2002/0152165 | A1* | 10/2002 | Dutta | ................... | G06Q 20/04 |
| | | | | | 705/41 |
| 2002/0193997 | A1* | 12/2002 | Fitzpatrick | ............. | G10L 15/26 |
| | | | | | 704/E15.045 |
| 2003/0097332 | A1* | 5/2003 | Golasinski | .......... | G06Q 20/042 |
| | | | | | 705/40 |
| 2008/0183706 | A1* | 7/2008 | Dong | ............... | G06F 16/90332 |
| | | | | | 707/E17.139 |
| 2010/0331043 | A1* | 12/2010 | Chapman | ................ | H04L 67/06 |
| | | | | | 455/556.1 |
| 2013/0094633 | A1* | 4/2013 | Mauro | ............... | H04M 7/0039 |
| | | | | | 379/88.01 |
| 2013/0282380 | A1* | 10/2013 | Mauro | ................ | G06Q 20/305 |
| | | | | | 704/E21.001 |
| 2014/0089098 | A1* | 3/2014 | Roundtree | ............. | G06Q 30/02 |
| | | | | | 455/418 |
| 2014/0257807 | A1* | 9/2014 | Mauro | ................... | G10L 21/06 |
| | | | | | 704/235 |
| 2015/0170231 | A1* | 6/2015 | Kitchen | ............ | G06Q 20/0855 |
| | | | | | 705/34 |
| 2018/0211234 | A1* | 7/2018 | Rohatgi | ................. | G06F 9/542 |

OTHER PUBLICATIONS

N. Indurkhya et al., Handbook of Natural Language Processing, 2nd ed, 2010, Chapman & Hall/CRC Press/Taylor and Francis Group, Machine Learning & Pattern Recognition Series (Year: 2010).

* cited by examiner

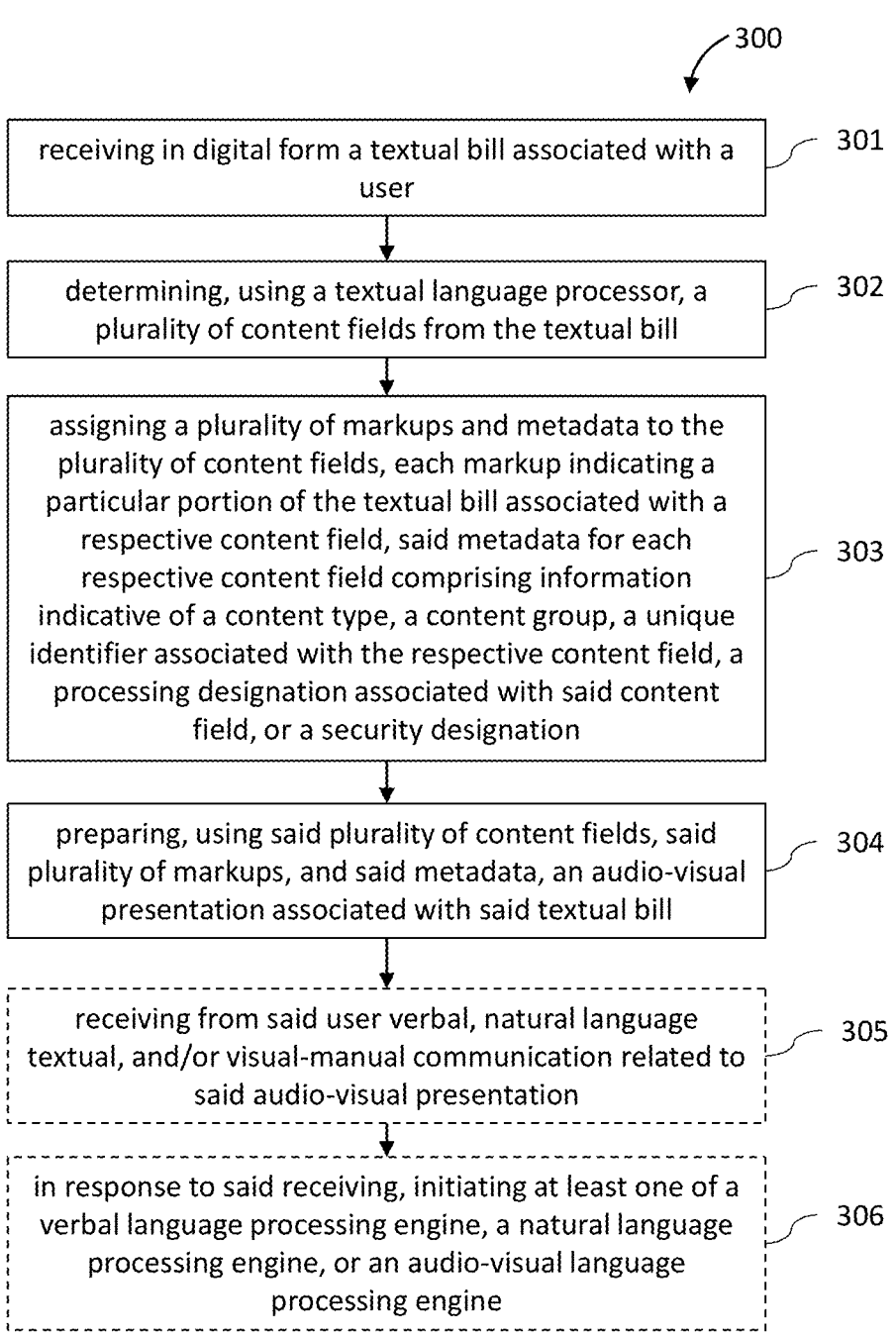

300 receiving in digital form a textual bill associated with a user — 301 determining, using a textual language processor, a plurality of content fields from the textual bill — 302 assigning a plurality of markups and metadata to the plurality of content fields, each markup indicating a particular portion of the textual bill associated with a respective content field, said metadata for each respective content field comprising information indicative of a content type, a content group, a unique identifier associated with the respective content field, a processing designation associated with said content field, or a security designation — 303 preparing, using said plurality of content fields, said plurality of markups, and said metadata, an audio-visual presentation associated with said textual bill — 304 receiving from said user verbal, natural language textual, and/or visual-manual communication related to said audio-visual presentation — 305 in response to said receiving, initiating at least one of a verbal language processing engine, a natural language processing engine, or an audio-visual language processing engine — 306

FIG. 4

SYSTEMS AND METHODS FOR INTERACTIVE VIDEO PRESENTATION OF TRANSACTIONAL INFORMATION

CROSS-REFERENCE TO RELATED APPLICATIONS

This application is a continuation of U.S. Non-Provisional patent application Ser. No. 17/000,741, filed Aug. 24, 2020 and entitled "Systems and Methods for Interactive Video Presentation of Transactional Information, which claims priority to, and the benefit of, U.S. Provisional Patent Application Ser. No. 62/890,115, filed Aug. 22, 2019 and entitled "Systems and Methods for Interactive Video Presentation of Transactional Information," the entire disclosures of each of which are hereby incorporated herein by reference in their entireties for all purposes.

TECHNICAL FIELD

An example embodiment relates generally to electronic communication technology, particularly in the context of providing transactional and other information in an interactive format.

BACKGROUND

Transactional information such as bills, account statements, and other such information are typically transmitted to users by way of conventional digital files or links to conventional digital files such that the transactional information can be presented to users, according to the conventional digital approach, in a manner reminiscent of a conventional physical approach for receiving physical documents containing such transactional information. Said another way, according to conventional approaches, a document is created in digital format that is in all or most aspects identical to a physical version of the same document, e.g., in both aesthetic form and practical function. As such, the cost of printing and shipping physical documents is eliminated and replaced with the often lesser cost of creating, storing, and transmitting the digital document. However, from the user perspective, the received document is much the same as the physical alternative in that documents, such as bills, account summaries, statements, and other documents presenting transactional information are often rigidly formatted, complex, confusing for users, and comprise finite information. As such, the use of such electronic communication with a user (e.g., a payor) by a sender (e.g., a payee) is often easier and less costly for the sender but conveys little or no benefit for the user.

Similarly, upon receiving the conventional electronic communication from the sender, the user often has questions related to the transactional or other information provided by the electronic communication, or information missing from the same. However, the conventional approach typically requires that the user initiate a separate contact with the sender via another forum (e.g., email, telephone, online textual chat, or the like) that is outside of the confines of the electronic communication to ask such questions. Furthermore, conventional electronic communication related to transactional information (e.g., bills, account statements, and the like), as with conventional physical communication of such transactional information, is often limited in the amount of user customization that can be achieved since the communications typically do not change and are not alterable by the sender, user, or a third party after being prepared by the sender or a third party and transmitted to the user. The inventors of the invention disclosed herein have identified these and other technical challenges and have developed the solutions described and otherwise disclosed herein.

SUMMARY

Method, apparatuses, and computer program products are therefore provided in accordance with an example embodiment to provide for interactive video and audio-visual presentation of transaction documents.

According to a first embodiment, a method for preparing an interactive bill for a user can comprise receiving in digital form a textual bill associated with a user, determining, using a textual language processor, a plurality of content fields from the textual bill, assigning a plurality of markups and metadata to the plurality of content fields, each markup indicating a particular portion of the textual bill associated with a respective content field, said metadata for each respective content field comprising information indicative of a content type, a content group, a unique identifier associated with the respective content field, a processing designation associated with said content field, or a security designation, and preparing, using said plurality of content fields, said plurality of markups, and said metadata, an audio-visual presentation associated with said textual bill. In some embodiments, the method can further comprise receiving from said user one or more of verbal, natural language textual, and visual-manual communication related to said audio-visual presentation, and, in response to said receiving, initiating at least one of a verbal language processing engine, a natural language processing engine, and an audio-visual language processing engine.

According to a second embodiment, a method for preparing an interactive bill for a user can comprise receiving transactional information related to said user, said transactional information comprising one or more markups corresponding to one or more fields of said transactional information, and providing to said user an audio-visual presentation, said audio-visual presentation comprising an audio representation of said one or more field of said transactional information corresponding to said one or more markups and a video representation. In some embodiments, the method can further comprise receiving from said user one or more of verbal, natural language textual, and visual-manual communication related to said audio-visual presentation, and, in response to said receiving, initiating at least one of a verbal language processing engine, a natural language processing engine, and an audio-visual language processing engine. In some embodiments, the method can further comprise determining a response to said one or more of verbal, natural language textual, and visual-manual communication related to said audio-visual presentation and presenting a further audio-visual presentation indicative of said response to said one or more of verbal, natural language textual, and visual-manual communication.

According to a third embodiment, an apparatus can comprise at least one processor and at least one memory including computer program instructions, said at least one processor configured, with said at least one memory including computer program instructions, at least to receive in digital form a textual bill associated with a user, determine, using a textual language processor, a plurality of content fields from the textual bill, assign a plurality of markups and metadata to the plurality of content fields, each markup indicating a particular portion of the textual bill associated with a respective content field, said metadata for each respective content field comprising information indicative of a content type, a content group, a unique identifier associated with the respective content field, a processing designation associated with said content field, or a security designation, and prepare, using said plurality of content fields, said plurality of markups, and said metadata, an audio-visual presentation associated with said textual bill. In some embodiments, the at least one processor can be configured, with said at least one memory including computer program instructions, at least to receive from said user one or more of verbal, natural language textual, and visual-manual communication related to said audio-visual presentation, and, in response to said receiving, initiate at least one of a verbal language processing engine, a natural language processing engine, and an audio-visual language processing engine.

According to a fourth embodiment, an apparatus can comprise at least one processor and at least one memory including computer program instructions, said at least one processor configured, with said at least one memory including computer program instructions, at least to receive transactional information related to said user, said transactional information comprising one or more markups corresponding to one or more fields of said transactional information, and provide to said user an audio-visual presentation, said audio-visual presentation comprising an audio representation of said one or more field of said transactional information corresponding to said one or more markups and a video representation. In some embodiments, the at least one processor can be configured, with said at least one memory including computer program instructions, at least to receive from said user, one or more of verbal, natural language textual, and visual-manual communication related to said audio-visual presentation and, in response to said receiving, initiate at least one of a verbal language processing engine, a natural language processing engine, and an audio-visual language processing engine. In some embodiments, the at least one processor is configured, with said at least one memory including computer program instructions, at least to present a further audio-visual presentation indicative of said response to said one or more of verbal, natural language textual, and visual-manual communication.

According to a fifth embodiment, an apparatus can comprise means, such as at least one processor and at least one memory including computer program instructions, for preparing an interactive bill for a user. In some embodiments, the apparatus can comprise means for receiving in digital form a textual bill associated with a user, means for determining a plurality of content fields from the textual bill, means for assigning a plurality of markups and metadata to the plurality of content fields, each markup indicating a particular portion of the textual bill associated with a respective content field, said metadata for each respective content field comprising information indicative of a content type, a content group, a unique identifier associated with the respective content field, a processing designation associated with said content field, or a security designation, and means for preparing, using said plurality of content fields, said plurality of markups, and said metadata, an audio-visual presentation associated with said textual bill. In some embodiments, the apparatus can further comprise means for receiving, from said user, one or more of verbal, natural language textual, and visual-manual communication related to said audio-visual presentation, and means for, in response to said receiving, initiating at least one of a verbal language processing engine, a natural language processing engine, and an audio-visual language processing engine.

According to a sixth embodiment, an apparatus can comprise means, such as at least one processor and at least one memory including computer program instructions, for preparing an interactive bill for a user. In some embodiments, the apparatus can comprise means for receiving transactional information related to said user, said transactional information comprising one or more markups corresponding to one or more fields of said transactional information, and means for providing to said user an audio-visual presentation, said audio-visual presentation comprising an audio representation of said one or more field of said transactional information corresponding to said one or more markups and a video representation. In some embodiments, the apparatus can further comprise means for receiving, from said user, one or more of verbal, natural language textual, and visual-manual communication related to said audio-visual presentation, and means for, in response to said receiving, initiating at least one of verbal language processing, natural language processing, and audio-visual language processing. In some embodiments, the apparatus can further comprise means for determining a response to said one or more of verbal, natural language textual, and visual-manual communication related to said audio-visual presentation and means for presenting a further audio-visual presentation indicative of said response to said one or more of verbal, natural language textual, and visual-manual communication.

According to a seventh embodiment, at least one non-transitory computer readable medium can comprise instructions that, when executed, cause a computing device to perform at least the following receive in digital form a textual bill associated with a user, determine, using a textual language processor, a plurality of content fields from the textual bill, assign a plurality of markups and metadata to the plurality of content fields, each markup indicating a particular portion of the textual bill associated with a respective content field, said metadata for each respective content field comprising information indicative of a content type, a content group, a unique identifier associated with the respective content field, a processing designation associated with said content field, or a security designation, and prepare, using said plurality of content fields, said plurality of markups, and said metadata, an audio-visual presentation associated with said textual bill. In some embodiment, the at least one non-transitory computer readable medium can further comprise instructions that, when executed, cause the computing device to perform at least the following receiving, from said user, one or more of verbal, natural language textual, and visual-manual communication related to said audio-visual presentation and, in response to said receiving, initiating at least one of a verbal language processing engine, a natural language processing engine, and an audio-visual language processing engine.

According to an eighth embodiment, at least one non-transitory computer readable medium can comprise instructions that, when executed, cause a computing device to perform at least receive transactional information related to said user, said transactional information comprising one or more markups corresponding to one or more fields of said transactional information, and provide to said user an audio-visual presentation, said audio-visual presentation comprising an audio representation of said one or more field of said transactional information corresponding to said one or more markups and a video representation. In some embodiments, the at least one non-transitory computer readable medium can further comprise instructions that, when executed, cause the computing device to at least receive from said one or more of verbal, natural language textual, and visual-manual communication related to said audio-visual presentation and, in response to said receiving, initiate at least one of a verbal language processing engine, a natural language processing engine, and an audio-visual language processing engine. In some embodiments, the at least one non-transitory computer readable medium can further comprise instructions that, when executed, cause the computing device to at least present a further audio-visual presentation indicative of said response to said one or more of verbal, natural language textual, and visual-manual communication.

According to a ninth embodiment, a method can be provided or carried out for preparing an interactive bill for a user. In some embodiments, the method comprises: receiving, at a computing device, digital information associated with a bill between a payee and a payor, the digital information comprising textual information indicative of payee information, payor information, and bill information; determining, using a textual language processor, from at least the digital information associated with the bill between the payee and the payor, a plurality of content fields from the bill; assigning one or more markups and one or more metadata with respective content fields of the plurality of content fields, wherein respective markups indicate a particular portion of the bill associated with respective content fields of the plurality of content fields, wherein respective metadata associated with respective content fields of the plurality of content fields comprise one or more from among: information indicative of a content type, a content group, a unique identifier associated with the respective content field, a processing designation associated with said content field, and a security designation; the method further comprising: generating, using said plurality of content fields, said plurality of markups, and said metadata, an audio-visual presentation associated with said bill. In some embodiments, the method can further comprise: providing said audio-visual presentation associated with said bill to a payor device associated with said payor. In some embodiments, the method can further comprise: receiving, from said payor device associated with said payor, one or more of verbal communication related to said audio-visual presentation, natural language textual communication related to said audio-visual presentation, and visual-manual communication related to said audio-visual presentation; and, in response to said receiving, initiating one or more from among: a verbal language processing engine, a natural language processing engine, and an audio-visual language processing engine. In some embodiments, the method can further comprise: determining, using one or more of the verbal language processing engine, the natural language processing engine, or the audio-visual language processing engine, a response to said one or more of verbal communication, natural language textual communication, and visual-manual communication received from said payor device; generating a further audio-visual presentation indicative of said response; and providing said further audio-visual presentation indicative of said response to said payor device. In some embodiments, the method can further comprise: determining whether said one or more of verbal communication related to said audio-visual presentation, natural language textual communication related to said audio-visual presentation, and visual-manual communication related to said audio-visual presentation is indicative of a question that can only be answered by said payee; and, in an instance in which said one or more of verbal communication related to said audio-visual presentation, natural language textual communication related to said audio-visual presentation, and visual-manual communication related to said audio-visual presentation is determined to be indicative of a question that can only be answered by said payee, forwarding said one or more of verbal communication related to said audio-visual presentation, natural language textual communication related to said audio-visual presentation, and visual-manual communication related to said audio-visual presentation to a payee device. In some embodiments, the method can further comprise: determining whether said one or more of verbal communication related to said audio-visual presentation, natural language textual communication related to said audio-visual presentation, and visual-manual communication related to said audio-visual presentation is indicative of a command to initiate a payment between the payor and the payee; determining, from said plurality of content fields from the bill, at least one billed amount; generating a payment command message indicative of a command to initiate payment of the billed amount, from an account associated with the payor, to an account associated with the payee; and transmitting said payment command message to or towards one or more of: the payee device, the payor device, a payment processing device, and a banking device.

According to a tenth embodiment, an apparatus can be provided that comprises at least one processor and at least one memory including computer program instructions. In some embodiments, said at least one processor can be configured, with said at least one memory including computer program instructions, at least to: receive digital information associated with a bill between a payee and a payor, the digital information comprising textual information indicative of payee information, payor information, and bill information; determine, using a textual language processor, from at least the digital information associated with the bill between the payee and the payor, a plurality of content fields from the bill; assign one or more markups and one or more metadata with respective content fields of the plurality of content fields, wherein respective markups indicate a particular portion of the bill associated with respective content fields of the plurality of content fields, wherein respective metadata associated with respective content fields of the plurality of content fields comprise one or more from among: information indicative of a content type, a content group, a unique identifier associated with the respective content field, a processing designation associated with said content field, and a security designation; and generate, using said plurality of content fields, said plurality of markups, and said metadata, an audio-visual presentation associated with said bill. In some embodiments, said at least one processor is further configured, with said at least one memory including computer program instructions, at least to: provide said audio-visual presentation associated with said bill to a payor device associated with said payor. In some embodiments, the apparatus can further comprise one or more of: a verbal language processing engine configured to process and linguistically analyze verbal language, aural language, data indicative of recorded aural language, textual information, numerical information, video, or images; a natural language processing engine configured to process and linguistically analyze verbal language, aural language, data indicative of recorded aural language, textual information, numerical information, video, or images; and an audio-visual language processing engine configured to process and linguistically analyze verbal language, aural language, data indicative of recorded aural language, textual information, numerical information, video, or images. In some embodiments, one or more of the verbal language processing engine, the natural language processing engine, and the audio-visual language processing engine is configured for at least one from among:

optical character recognition, speech recognition, speech segmentation, text-to-speech processing, word segmentation, tokenization, knowledge extraction, neural network analysis, machine learning analysis, probabilistic analysis and decision making, lemmatization, morphological segmentation, part-of-speech tagging, stemming, statistical analysis and semantic extrapolation, grammar induction, sentence breaking, sentence boundary disambiguation, parsing, stochastic grammar analysis, lexical semantic analysis, distribution semantic analysis, named entry recognition, sentiment analysis, terminology extraction, word sense disambiguation, relationship extraction, semantic parsing, semantic role labelling, coreference resolution, discourse analysis, implicit semantic role labelling, textual entailment recognition, topic segmentation and recognition, automatic summarization, machine translation, natural language understanding, natural language generation, and question answering. In some embodiments, said at least one processor is further configured, with said at least one memory including computer program instructions, at least to: receive, from said payor device associated with said payor, one or more of verbal communication related to said audio-visual presentation, natural language textual communication related to said audio-visual presentation, and visual-manual communication related to said audio-visual presentation; and, in response to said receiving, initiate at least one of the verbal language processing engine, the natural language processing engine, or the audio-visual language processing engine. In some embodiments, said at least one processor is further configured, with said at least one memory including computer program instructions, at least to: determine, using one or more of the verbal language processing engine, the natural language processing engine, or the audio-visual language processing engine, a response to said one or more of verbal communication related to said audio-visual presentation, natural language textual communication related to said audio-visual presentation, and visual-manual communication related to said audio-visual presentation received from said payor device; generate a further audio-visual presentation indicative of said response; and provide said further audio-visual presentation indicative of said response to said payor device. In some embodiments, said at least one processor is further configured, with said at least one memory including computer program instructions, at least to: determine whether said one or more of verbal communication related to said audio-visual presentation, natural language textual communication related to said audio-visual presentation, and visual-manual communication related to said audio-visual presentation is indicative of a question that can only be answered by said payee; and, in an instance in which said one or more of verbal communication related to said audio-visual presentation, natural language textual communication related to said audio-visual presentation, and visual-manual communication related to said audio-visual presentation is determined to be indicative of a question that can only be answered by said payee, forward said one or more of verbal communication related to said audio-visual presentation, natural language textual communication related to said audio-visual presentation, and visual-manual communication related to said audio-visual presentation to a payee device. In some embodiments, said at least one processor is further configured, with said at least one memory including computer program instructions, at least to: determine whether said one or more of verbal communication related to said audio-visual presentation, natural language textual communication related to said audio-visual presentation, and visual-manual communication related to said audio-visual presentation is indicative of a command to initiate a payment between the payor and the payee; determine, from said plurality of content fields from the bill, at least one billed amount; generating a payment command message indicative of a command to initiate payment of the billed amount, from an account associated with the payor, to an account associated with the payee; and transmit said payment command message to or towards one or more of: the payee device, the payor device, a payment processing device, and a banking device.

According to an eleventh embodiment, at least one non-transitory computer readable medium can be provided that comprises instructions, such as computer-executable instructions. In some embodiments, the instructions, when executed, can cause a computing device to perform at least the following: receive, at the computing device, digital information associated with a bill between a payee and a payor, the digital information comprising textual information indicative of payee information, payor information, and bill information; determine, using a textual language processor, from at least the digital information associated with the bill between the payee and the payor, a plurality of content fields from the bill; assign one or more markups and one or more metadata with respective content fields of the plurality of content fields, wherein respective markups indicate a particular portion of the bill associated with respective content fields of the plurality of content fields, wherein respective metadata associated with respective content fields of the plurality of content fields comprise one or more from among: information indicative of a content type, a content group, a unique identifier associated with the respective content field, a processing designation associated with said content field, and a security designation; and generate, using said plurality of content fields, said plurality of markups, and said metadata, an audio-visual presentation associated with said bill. In some embodiments, the instructions, when executed, can further cause the computing device to perform at least the following: provide said audio-visual presentation associated with said bill to a payor device associated with said payor. In some embodiments, the instructions, when executed, can further cause the computing device to perform at least the following: receive, from said payor device associated with said payor, one or more of verbal communication related to said audio-visual presentation, natural language textual communication related to said audio-visual presentation, and visual-manual communication related to said audio-visual presentation; and, in response to said receiving, initiate one or more from among: a verbal language processing engine, a natural language processing engine, and an audio-visual language processing engine. In some embodiments, the instructions, when executed, can further cause the computing device to perform at least the following: determine, using one or more of the verbal language processing engine, the natural language processing engine, or the audio-visual language processing engine, a response to said one or more of verbal communication, natural language textual communication, and visual-manual communication received from said payor device; generate a further audio-visual presentation indicative of said response; and provide said further audio-visual presentation indicative of said response to said payor device. In some embodiments, the instructions, when executed, can further cause the computing device to perform at least the following: determine whether said one or more of verbal communication related to said audio-visual presentation, natural language textual communication related to said audio-visual presentation, and visual-manual communication related to said audio-visual presentation is indicative of a question that can only be answered by said payee; and, in an instance in which said one or more of verbal communication related to said audio-visual presentation, natural language textual communication related to said audio-visual presentation, and visual-manual communication related to said audio-visual presentation is determined to be indicative of a question that can only be answered by said payee, forward said one or more of verbal communication related to said audio-visual presentation, natural language textual communication related to said audio-visual presentation, and visual-manual communication related to said audio-visual presentation to a payee device. In some embodiments, the instructions, when executed, can further cause the computing device to perform at least the following: determine whether said one or more of verbal communication related to said audio-visual presentation, natural language textual communication related to said audio-visual presentation, and visual-manual communication related to said audio-visual presentation is indicative of a command to initiate a payment between the payor and the payee; determine, from said plurality of content fields from the bill, at least one billed amount; generating a payment command message indicative of a command to initiate payment of the billed amount, from an account associated with the payor, to an account associated with the payee; and transmit said payment command message to or towards one or more of: the payee device, the payor device, a payment processing device, and a banking device.

According to a twelfth embodiment, an apparatus can be provided that comprises means, such as at least one processor and at least one memory storing computer program code or computer-executable instructions. In some embodiment, the apparatus can comprise means for: receiving digital information associated with a bill between a payee and a payor, the digital information comprising textual information indicative of payee information, payor information, and bill information; determining, using a textual language processor, from at least the digital information associated with the bill between the payee and the payor, a plurality of content fields from the bill; assigning one or more markups and one or more metadata with respective content fields of the plurality of content fields, wherein respective markups indicate a particular portion of the bill associated with respective content fields of the plurality of content fields, wherein respective metadata associated with respective content fields of the plurality of content fields comprise one or more from among: information indicative of a content type, a content group, a unique identifier associated with the respective content field, a processing designation associated with said content field, and a security designation; and generating, using said plurality of content fields, said plurality of markups, and said metadata, an audio-visual presentation associated with said bill. In some embodiments, the apparatus can further comprise means for providing said audio-visual presentation associated with said bill to a payor device associated with said payor. In some embodiments, the apparatus can further comprise means for receiving, from said payor device associated with said payor, one or more of verbal communication related to said audio-visual presentation, natural language textual communication related to said audio-visual presentation, and visual-manual communication related to said audio-visual presentation; and, in response to said receiving, initiating one or more from among: a verbal language processing engine, a natural language processing engine, and an audio-visual language processing engine. In some embodiments, the apparatus can further comprise means for determining, using one or more of the verbal language processing engine, the natural language processing engine, or the audio-visual language processing engine, a response to said one or more of verbal communication, natural language textual communication, and visual-manual communication received from said payor device; generating a further audio-visual presentation indicative of said response; and providing said further audio-visual presentation indicative of said response to said payor device. In some embodiments, the apparatus can further comprise means for determining whether said one or more of verbal communication related to said audio-visual presentation, natural language textual communication related to said audio-visual presentation, and visual-manual communication related to said audio-visual presentation is indicative of a question that can only be answered by said payee; and, in an instance in which said one or more of verbal communication related to said audio-visual presentation, natural language textual communication related to said audio-visual presentation, and visual-manual communication related to said audio-visual presentation is determined to be indicative of a question that can only be answered by said payee, forwarding said one or more of verbal communication related to said audio-visual presentation, natural language textual communication related to said audio-visual presentation, and visual-manual communication related to said audio-visual presentation to a payee device. In some embodiments, the apparatus can further comprise means for determining whether said one or more of verbal communication related to said audio-visual presentation, natural language textual communication related to said audio-visual presentation, and visual-manual communication related to said audio-visual presentation is indicative of a command to initiate a payment between the payor and the payee; determining, from said plurality of content fields from the bill, at least one billed amount; generating a payment command message indicative of a command to initiate payment of the billed amount, from an account associated with the payor, to an account associated with the payee; and transmitting said payment command message to or towards one or more of: the payee device, the payor device, a payment processing device, and a banking device.

BRIEF DESCRIPTION OF THE DRAWINGS

Figure 1:
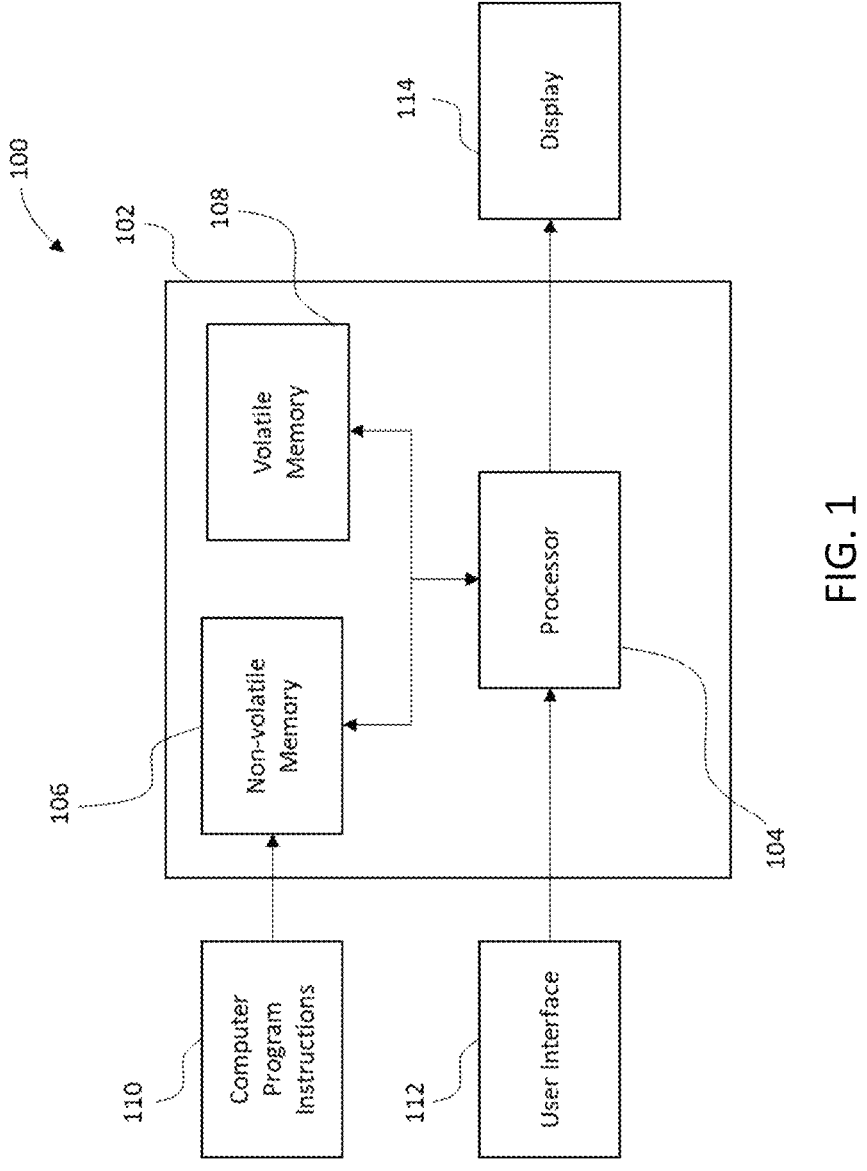
Figure 2:
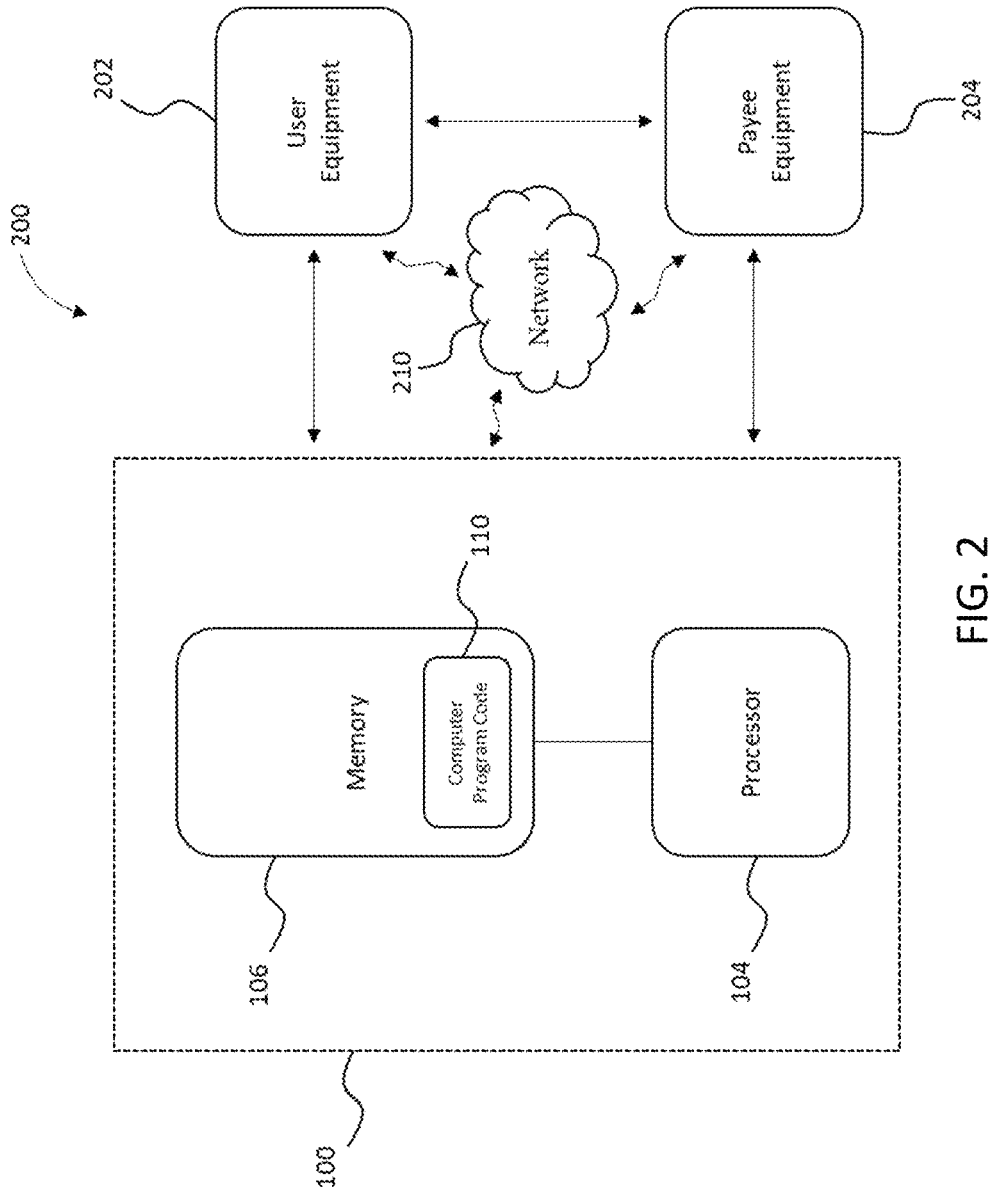
Figure 3:
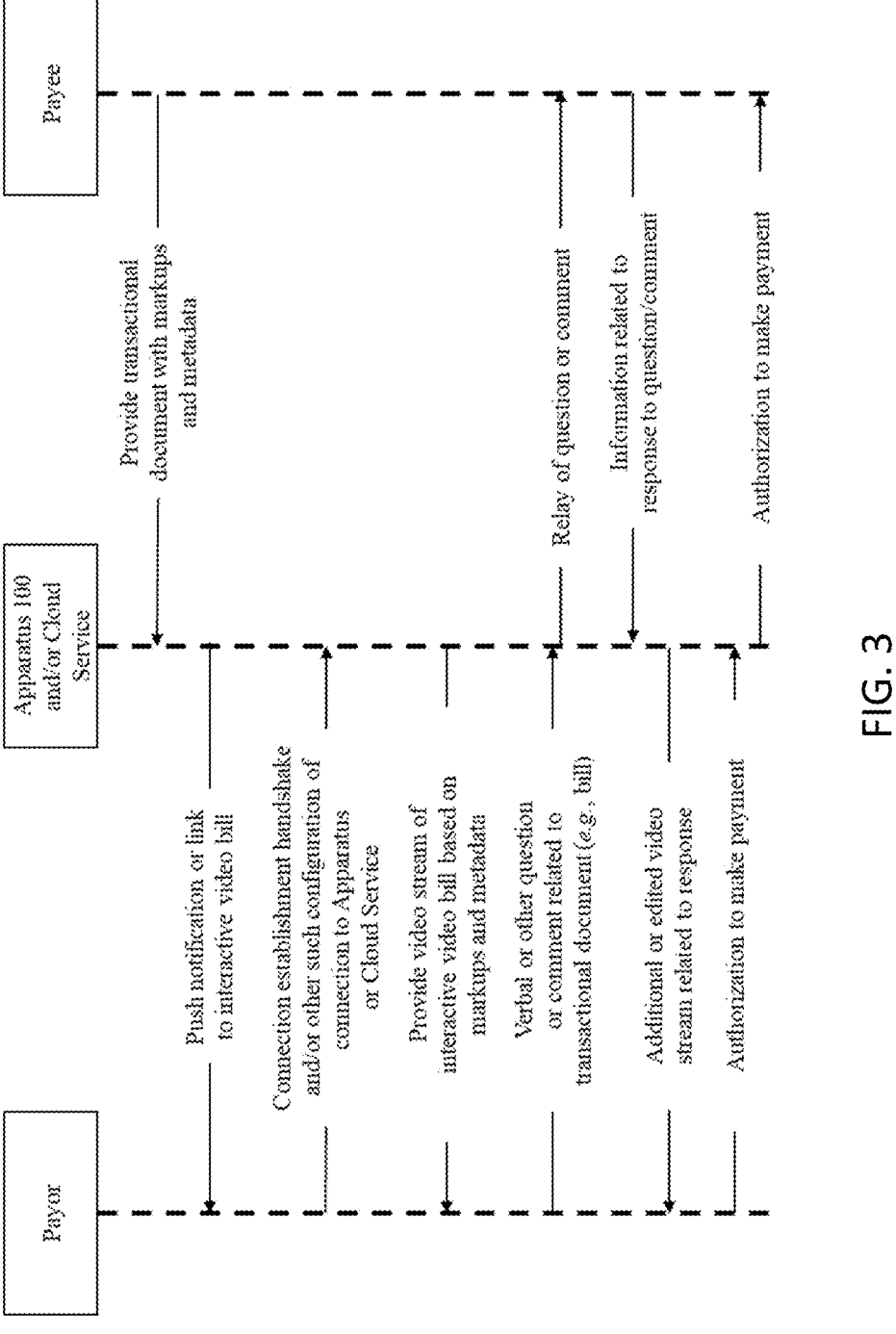
Figure 5:
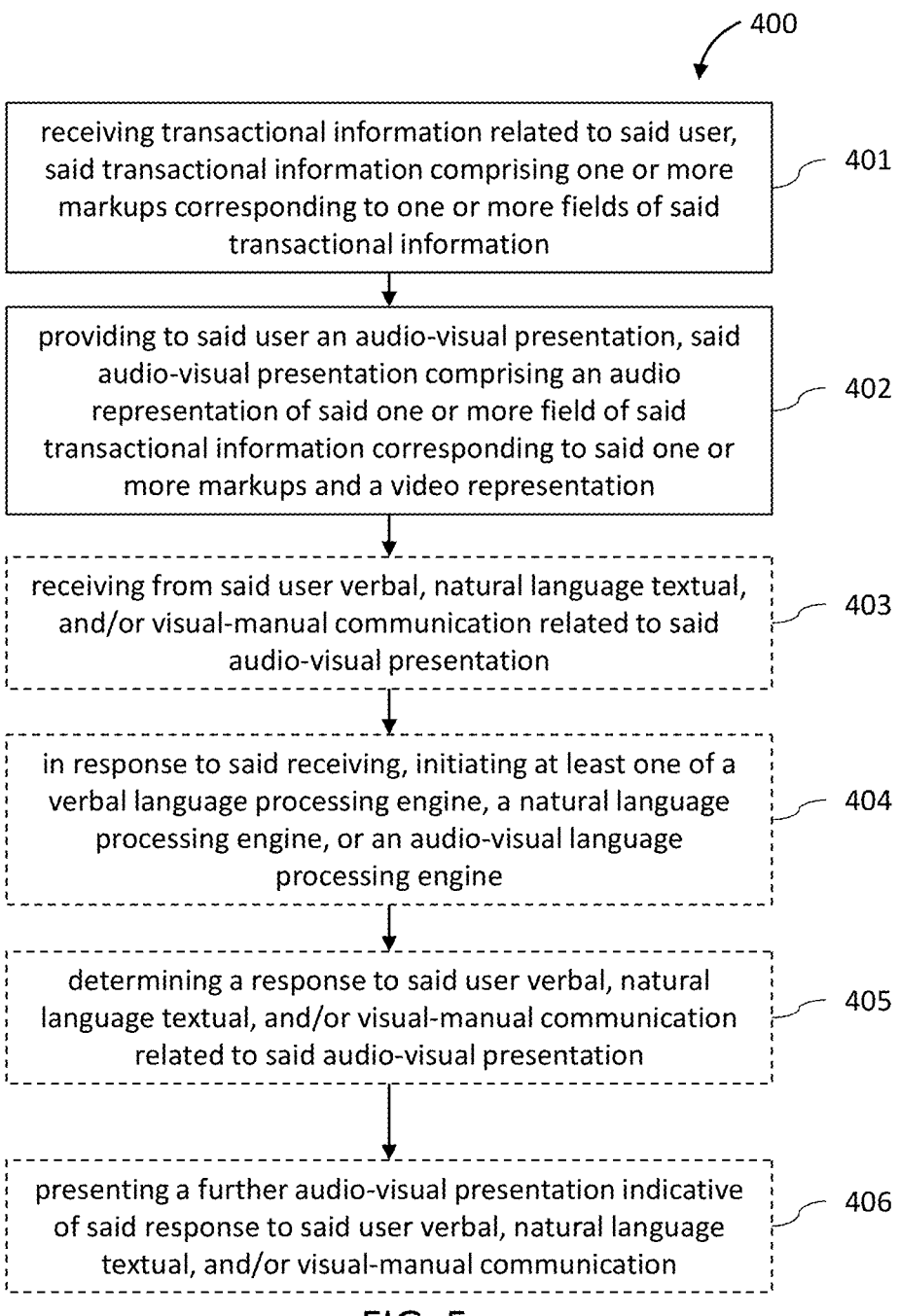
Figure 6:
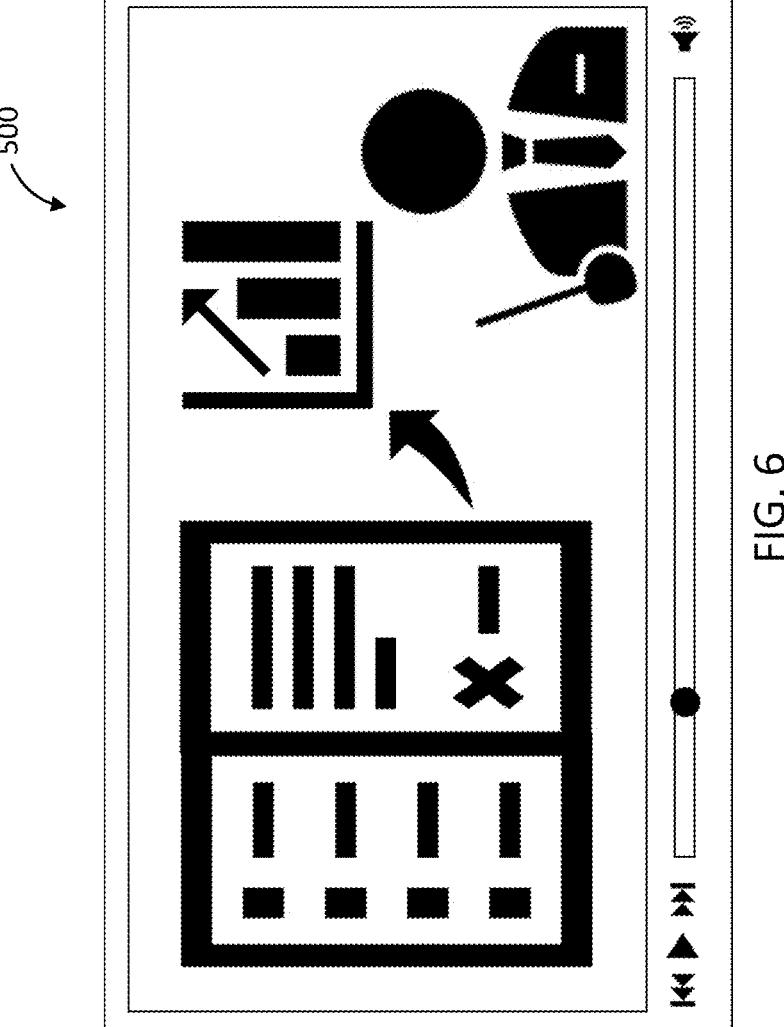

Having thus described certain example embodiments of the present disclosure in general terms, reference will hereinafter be made to the accompanying drawings, which are not necessarily drawn to scale, and wherein:

FIG. 1 is an apparatus diagram illustrating a computing device for carrying out one or more aspects of the currently disclosed invention;

FIG. 2 is a distributed cloud server diagram illustrating a system for carrying out one or more aspects of the currently disclosed invention;

FIG. 3 is a transaction map illustrating transactions between a payor and a payee by way of an apparatus or cloud service, according to one or more embodiments of the present invention;

FIG. 4 is a block flow diagram of a method for presenting an interactive video representing secure, transactional information, according to one or more embodiments of the present invention;

FIG. 5 is a block flow diagram of a method for presenting an interactive video representing secure, transactional information, according to a particular embodiment of the present invention; and FIG. 6 illustrates a display for presenting an interactive video representation of a transactional document, according to a particular embodiment of the present invention.

Throughout the drawings, the same or similar reference numerals represent the same or similar element.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

In the following description and claims, unless defined otherwise, all technical and scientific terms used herein have the same meaning as commonly understood by one of ordinary skills in the art to which this disclosure belongs.

As used herein, the terms "user device," "payor device," "terminal device," and "user equipment" (UE) refer to any devices capable of wired or wireless communications with each other or with a network device, and which is associated with a user or payor or is caused to present or display information, data, graphics, or the like to a user or payor. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, smart phones, wireless-enabled tablet computers, laptop-embedded equipment (LEE), smart devices, smart home devices, home automation devices, internet-of-things (IoT) devices, personal assistant devices, laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

UE may be configured to be connected with and/or in communication with one or more network entities or network devices, which may include, but are not limited to: a network node, an access node, a cell tower, an eNodeB, a gNodeB, a core Access and Mobility Management Function (AMF), a Session Management Function (SMF), a Policy Control Function (PCF), a Network Slice Selection Fuction (NSSF), an authentication server function (AUSF), a unified data function (UDM), a network exposure function (NEF), a network repository function (NRF), an application function (AF), a user plane function (UPF), a data network (DN), any other entity, node, or device of a public land mobile network (PLMN) or non-public mobile network (NPN), such as a standalone NPN (SNPN). In some embodiments, the UE may be configured to additionally or alternatively be connected with and/or in communication with a wireless local area network (WLAN) or the like. In some embodiments, a system may be provided in which UE are supported by a home PLMN (HPLMN) or visiting PLMN (VPLMN), such as via a direct subscriber connection or via a roaming connection. In some embodiments, therefore, communication and/or communication between UE and a network or network entity may be wired, wireless (via an over-the-air interface), a combination thereof, or the like.

As used herein, the term "network device" refers to a network device via which services can be provided to a terminal device in a communication network. In some embodiments, the network device may comprise any suitable device via which a terminal device or UE can access the communication network. Examples of the network devices can include but are not limited to one or more from among: a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), and a low power node such as a femto, a pico, or the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, "Hypertext Transfer Protocol" ("HTTP") refers to a set of rules for transferring files (such as text files, graphic images, sound, video, and other multimedia files) between devices and on the Internet.

Embodiments described herein relate generally to systems, methods, apparatuses, and computer program products for interactive video presentation of transactional information such as bills and the like.

Referring now to FIG. 1, an apparatus 100 is illustrated for presenting an interactive video presentation of transactional information, such as bills or the like, to a viewer or user. The apparatus 100 can comprise a computing device 102 that includes at least a processor 104 and one or both of a non-volatile memory 106 and a volatile memory 108. In some embodiments, the computing device 102 can be configured such that the processor 104 can be operably coupled to or otherwise in communication with one or both of the non-volatile memory 106 and the volatile memory 108. In some embodiments, the computing device 102 can comprise a laptop computer, a desktop computer, a cloud computing device, a server, a network, a hand-held computer, a mobile computing device, a mobile phone, a personal digital assistant, a tablet computer, any combination thereof, or the like.

In some embodiments, the processor 104 may comprise any electronic circuit configured to perform operations on a memory, such as the non-volatile memory 106 or volatile memory 108 or the like. In some embodiments, the processor 104 can comprise a central processing unit, a graphics processing unit, a vision processing unit, a tensor processing unit, a neural processing unit, a digital signal processor, an image signal processor, a synergistic processing element, a field-programmable gate array, a sound chip, or the like. In some embodiments, the processor 104 can comprise an arithmetic logic unit (not shown), a control unit (not shown), a speed clock (not shown), and/or the like. In some embodiments, the processor 104 can comprise one or more processing chips, microcontrollers, integrated chips, sockets, systems on a chip (SoC), array processor, vector processor, peripheral processing components, and the like.

In some embodiments, the non-volatile memory 106 can comprise any computer memory or memory device that can retain stored information even when not powered, such a read-only memory (ROM), flash memory, magnetic computer storage devices such as hard disks, floppy discs, magnetic tape, optical discs, paper tape, punched cards, FeRAM, CBRAM, PRAM, SONOS, RRAM, Racetrack memory, NRAM, Millipede, combinations thereof, and the like.

In some embodiments, the volatile memory 108 can comprise any computer memory or memory device that requires power to maintain the stored information, such as static random access memory (RAM), dynamic RAM, Z-RAM, TTRAM, A-RAM, ETA RAM, any combination thereof, or the like.

In some embodiments, the processor 104 or another such component of the computing device 102 can be configured to carry out a process or method based on computer program instructions 110. In some embodiments, the computer program instructions 110 can be stored on one of the non-volatile memory 106 and the volatile memory 108. In some embodiments, the computer program instructions 110 can be operable to cause the processor 104 to carry out any of the methods, approaches, processes, or the like disclosed herein. In some embodiments, the computer program code 110 can comprise one or more of: computer-readable instruction(s), computer code(s), coded application(s), computer program(s), software code(s), software(s), algorithm(s), model(s), computer-implemented process(es), machine-learning algorithm(s), and/or the like.

In the apparatus 100, the processor 104 (and any co-processors or other circuitry assisting or otherwise associated with the processor 104) may be in communication with the memory 106 or 108 via a bus for passing information among components of the apparatus 100. A memory device may include, for example, one or more volatile memories (e.g., 108) or non-volatile memories (e.g., 106). In other words, for example, the memory device may be an electronic storage device (e.g., a computer readable storage medium) comprising gates configured to store data (e.g., bits) that may be retrievable by a machine (e.g., a computing device like the processor 104). The memory device (e.g., 106 or 108) may be configured to store information, data, content, applications, instructions, or the like for enabling the apparatus to carry out various functions in accordance with an example embodiment of the present disclosure. For example, the memory device could be configured to buffer input data for processing by the processor 104. Additionally or alternatively, the memory device could be configured to store instructions for execution by the processor 104, such as storing a warning message to be executed by the processor 104 and displayed on the user interface.

The apparatus 100 may, in some embodiments, be embodied in various computing devices as described above. However, in some embodiments, the apparatus 100 may be embodied as a chip or chip set. In other words, the apparatus 100 may comprise one or more physical packages (e.g., chips) including materials, components and wires on a structural assembly (e.g., a baseboard). A structural assembly of the apparatus 100 may provide for physical strength, conservation of size, and limitation of electrical interaction for component circuitry included thereon. The apparatus 100 may therefore, in some cases, be configured to implement an embodiment of the present disclosure on a single chip or as a single "system on a chip." As such, in some cases, a chip or chipset may constitute means for performing one or more operations for providing the functionalities described herein.

The processor 104 may be embodied in a number of different ways. For example, the processor 104 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 104 may include one or more processing cores configured to perform independently. A multi-core processor 104 may enable multiprocessing within a single physical package. Additionally or alternatively, the processor 104 may include one or more processors 104 configured in tandem via the bus to enable independent execution of instructions, pipelining, and multithreading.

In an example embodiment, the processor 104 may be configured to execute instructions stored in the memory 106 or 108 or otherwise accessible to the processor 104. Alternatively or additionally, the processor 104 may be configured to execute hard coded functionality. As such, whether configured by hardware or software methods, or by a combination thereof, the processor 104 may represent an entity (e.g., physically embodied in circuitry) capable of performing operations according to an embodiment of the present disclosure while configured accordingly. Thus, for example, when the processor 104 is embodied as an ASIC, FPGA or the like, the processor 104 may be specifically configured hardware for conducting the operations described herein or causing the apparatus 100 or other components of the apparatus 100 to perform or conduct the operations described herein. Alternatively, as another example, when the processor 104 is embodied as an executor of instructions, the instructions may specifically configure the processor 104 to perform the algorithms and operations described herein when the instructions are executed. However, in some cases, the processor 104 may be a processor 104 of a specific device configured to employ an embodiment of the present disclosure by further configuration of the processor 104 by instructions for performing the algorithms and/or operations described herein. The processor 104 may include, among other things, a clock, an arithmetic logic unit (ALU) and logic gates configured to support operation of the processor 104.

In some embodiments, the apparatus 100 can further include a communication interface (not shown). In some embodiments, the communication interface may be any means such as a device or circuitry embodied in either hardware or a combination of hardware and software that is configured to receive and transmit data from/to a network or other devices or modules in communication with the apparatus 100, such as a wireless local area network (WLAN), a core network, a database or other storage means or device, etc. In this regard, the communication interface may include, for example, an antenna (or multiple antennas), supporting hardware, and supporting software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and other hardware/software for supporting communication via cable, digital subscriber line (DSL), universal serial bus (USB) or other mechanisms.

In some embodiments, the apparatus 100 can further comprise a user interface 112 configured such that a user or viewer can input data, information, requests, commands, or the like to the computing device 102 via any suitable input approach. For instance, in some embodiments, the user or viewer may use, e.g., the user interface 112, to input a command or other suitable inputs verbally, textually, via a signal such as an optical signal or electrical signal, digitally via any suitable computer language, visually, a combination of these, or the like. As such, the user interface 112 can comprise any of a variety of input devices suitable to capture a user's or viewer's input. Some but not all of the suitable input devices or hardware that can comprise or be comprised within the user interface 112 include a video camera, a microphone, a digital pointing device such as a mouse or touchpad, an interactive touchscreen, a virtual reality environment, an augmented reality environment, one or more sensors configured to sense a gesture made by the user or viewer, combinations thereof, or the like.

In some embodiments, the processor 104 can be operably coupled to or otherwise in communication with the user interface 112 such that a user or viewer can input data, information, requests, commands, or the like to the computing device 102 via any suitable input approach. By way of example only, in some embodiments, the user interface 112 can comprise a video camera configured to capture video of a user or view, a microphone configured to capture audio from a user or viewer, and an audio/video processing unit configured to interpret gestures, audio, or other types of inputs from the user or viewer and interpret the input as a command, question, data input, or the like.

In some embodiments, the apparatus 100 can further comprise a display 114 configured to present media content to a user or viewer. In some embodiments, the display 114 can be operably coupled to or otherwise in communication with the processor 104 or another such component of the computing device 102. In some embodiments, the display 114 can be coupled to or integrated into the same hardware device as the user interface 112 such that the same user or viewer may transmit inputs to the computing device 102 while the computing device 102 can transmit media content to the display 114 to present or cause the display 114 to present the media content to the user or viewer. By way of example only, such an integrated hardware device that comprises the user interface 112 and the display 114 could be an interactive display or monitor, a computer screen, a touch-sensitive display, a head-mounted display, a display with an integrated video camera or microphone, a display with an integrated sensor, or a display configured to otherwise capture input information (e.g., commands, data, questions, comments, and the like) from the user or viewer.

In some embodiments, such as illustrated in FIG. 2, the apparatus 100 or a component thereof can be a part of a system 200 and in communication with a user equipment 202, a payee equipment 204, or a network 210. In some embodiments, the system 200 or a component thereof, e.g., the network 210, can be stored, hosted, accessible via, or transmitted through a cloud computing environment, server, or the like. In some embodiments, the user equipment 202 can be a user's computer, such as a laptop or desktop computer, or a user's computing or networking device, such as a mobile phone, a PDA, or the like. In some embodiments, the payee equipment 204 can be any suitable equipment, devices, or systems operated by or on behalf of a payee rendering the interactive bill for the payor (e.g., a user, payor, billee, viewer, owner, or subscriber associated with the apparatus 100).

In some embodiments, some aspects or components of the system 200 can be very similar to, or the same as, corresponding aspects or components of the apparatus 100 and are therefore not described in further detail here. It is noted, however, that any of the previously described circuitry, components, communications devices, processors, memories, and the like, can be the same or similar to those described above with respect to the apparatus 100.

Additionally or alternatively, in some embodiments, the apparatus 100 can be configured simply to receive the media content and present the media content to the user or viewer. In some embodiments, the apparatus 100 can be configured to convert conventional transactional documents and the like to interactive media content and transmit that interactive media content to a user device or the like. In other words, in some embodiments, the apparatus 100 can be either a server-side device or a user device. In some embodiments, the apparatus 100 or a component thereof can be configured to be in wired or wireless communication with a network, a server, telecommunications equipment, a user device, another computing device, another processor, another memory device, or a mobile device such as a mobile phone or tablet.

In some embodiments, the media that the apparatus 100 is configured to present to the user or viewer may be any transactional information or otherwise secured information that is conventionally presented in textual form or graphical form. By way of example only, in some embodiments, the media can comprise an audio-visual media presentation. In some embodiments, the media can comprise an audio-visual media presentation in a three-dimensional (3D) format, a 360-degree video format, a two-dimensional (2D) format, an augmented reality video format, a holographic video format, combinations thereof, or the like.

In order to present the media in such a format and in an interactive manner to the user or viewer, the original form of the media, such as a digital document, can be edited, such as by adding markups, to define various sections or fields of the digital document to identify the information from the original form of the media that should be presented in video or audio format to the user or viewer by the apparatus 100. In some embodiments, an interactive document format can be used to designate the converted transactional documents suitable for presentation in an interactive video or audio-video format to the user or viewer. In some embodiments, the computing device 102 or a component thereof can employ a particular method or process, such as one or more algorithms, to determine relevant portions of a transactional document, such as a portable document format (PDF) document or the like. In some embodiments, the algorithm can be similar to or comprise an optical character recognition algorithm, a pattern recognition algorithm, an artificial intelligence program, a computer vision algorithm, machine learning algorithm, a neural network, a deep learning algorithm, a computer-assisted reviewing algorithm, a compound term processing algorithm, a natural language processing engine, a deep linguistic processing algorithm, a distributional semantics algorithm, a latent semantic indexing algorithm, a speech processing algorithm, a text-proofing algorithm, a question answering algorithm, a spoken dialogue algorithm, an algorithm or engine configured for more than one of these, or the like. In some embodiments, a supervised or partially supervised algorithm may be used to improve the prediction ability of the algorithm to properly assign a markup to a portion or field of a digital document for use of the contents of that portion or field in the interactive video presentation to the user or viewer.

By way of example only, in some embodiments in which the conventional transactional document is a bill being remitted to a payor (e.g., the user or viewer) for payment to a payee (e.g., a bank, a utility, or the like), the bill may be similar or comprise a similar structure or order of contents between many or all of a plurality of payors, meaning that the algorithm may be supervised or trained based upon a subset of bills for the plurality of payors to improve the accuracy of markup assignment to portions, characters, fields, and the like from the bill. In some embodiments, respective bills associated with each payor of a plurality of payors may comprise one or more of: information related to the payor, the payee, an account number, a type or quantity of a service, good, or utility for which the bill is being sent, a description or explanation of a service, good, or utility for which the bill is being sent, a date by which payment should or must be remitted, a payment remittance address, and the like. In some embodiments, the accuracy with which the supervised or otherwise trainable algorithm assigns a markup to each of the relevant portions, characters, fields, or the like from the transactional document (e.g., bill) can be improved by assigning manually a markup to the relevant portions, characters, fields, or the like for a subset of the respective bills for a subset of the plurality of payors and then inputting these manually marked-up documents to the algorithm. The algorithm may then understand the type, contents, relevance, general location, and handling procedures for each of the portions, characters, fields, and the like that should be assigned a markup for a remainder of respective bills associated with a remainder of the plurality of payors. Conversely, in some embodiments, an algorithm may be unsupervised such that a new plurality of transactional documents may be processed without first training the algorithm based upon manual assignment of markups to a portion of the new plurality of transactional documents.

In some embodiments, markups may comprise metadata associated with a particular visual, textual, or other suitable tag associated with a portion, character, or field from a transactional document, such as a bill. In some embodiments, markups may indicate the type of portion, character, or field from the transactional document that is being marked up, such as by the type of content (e.g., textual, numerical, graphical, visual, or the like). In some embodiments, markups may indicate which of one or more predefined or one or more automatically defined groupings of content (e.g., information related to the payor, the payee, an account number, a type or quantity of a service, good, or utility for which the bill is being sent, a date by which payment should or must be remitted, a payment remittance address, or the like) the portion, character, or field from the transactional document that is being marked up belongs. In some embodiments, markups may indicate a computer-readable transcription of the content of the portion, character, or field from the transactional document from the transactional document that is being marked up. In some embodiments, the markups may indicate an internal or external source of additional metadata, instructions, information, or the like associated with the portion, character, or field from the transactional document that is being marked up.

As such, in some embodiments, a markup may be an indication of a particular portion, character, or field from the transactional document and may associate that portion, character, or field with a wide array of metadata associated with the markup. In other words, when the apparatus 100 or a component thereof receives or generates the transactional document comprising markups for relevant portions, characters, and fields from the transactional document, the apparatus 100 or a component thereof may generate the interactive media based upon the transactional document comprising markups by extracting relevant subject matter for the interactive media from the markups and compiling the subject matter according to a predefined or dynamically defined order or structure. In other words, according to some embodiments in which the transactional document is a bill, the apparatus 100 might receive or generate the bill comprising markups for payor information, payee information, the amount owed by the payor, the type or amount or other suitable information associated with a good, service, or utility for which the bill is being sent, a desired or required remittance date, and the like. In some embodiments, the apparatus 100 may read a first markup associated with payor information and from that markup determine to whom the interactive media content should be sent and relevant contact information (e.g., cell phone number, email address, or the like). In some embodiments, the apparatus 100 may read a second markup associated with the payee information and from that markup determine a portion of a scripted interactive or video media content, such as an introduction to such media content that identifies visually, textually, or audibly for the payor who the payee is. In some embodiments, the apparatus 100 may read a third markup associated with an amount owed, such as one or more of: a minimum amount owed, a total amount owed, an amount owed from a previous payment period, a predicted amount owed for a future payment period, and the like, and from that third markup determine another portion of the scripted interactive or video media content, such as a portion of the media content that identifies visually, textually, or audibly for the payor the amount that is owed and the context of the amount owed (e.g., payment period, basis for amount owed, whether the amount owed is a minimum amount owed, a full amount owed, a predicted future amount owed, or the like). Many other types of content of the transactional document may be associated with such metadata using a markup, and the interactive, audio-visual media content presented to the user, viewer, or payee may be generated using any combination of content drawn directly from the transactional document, from metadata associated with the markups, from an internal or external source such as the Internet, an intranet, an associated media content source, a server, a cloud computing environment, or the like.

In some embodiments, to make the interactive media content interactive, the apparatus 100 or a component thereof, such as the computer program instructions 110, can initiate or instantiate an application, such as a computer program or software entity, at the time of presentation of the interactive media content to the user, viewer, or payee. In some embodiments, the application can be natural language processing engine, a computer bot, a chatbot, or the like, that is configured to receive input, such as from the user interface 112, the input indicative of a command, information, data, a question, a comment, or the like communicated via any manner and in any format from the user, viewer, or payee. In other words, a payor may verbally ask a question during presentation of the interactive media content, which may be captured by a microphone or other suitable peripheral devices associated with the apparatus 100 or a user device, and the apparatus 100 or the user device may instantiate the computer bot such that the computer bot receives the question, interprets the meaning of the question, retrieves relevant information or data from the metadata associated with the markups of the transactional document or from an internal or external source, and communicate to the payee an answer or another suitable response to the question from the payee, such as by interrupting the presentation or playback of the interactive media content and presenting alternative media content associated with the answer or other suitable response to the question from the payee. In some embodiments, the computer bot may determine that the answer or other suitable response has already been presented to the payee earlier in the presentation of the interactive media content, in which case the computer bot can pause the interactive media content, maintain a placeholder for the place in the interactive media content that was being presented when the interactive media content was paused, return to the relevant earlier portion of the interactive media content, and play the previously played portion of the interactive media content for the payor before returning to the placeholder for the place in the interactive media content that was being presented when the interactive media content was paused and resume presentation of the interactive media content from that placeholder. In some embodiments, the computer bot may determine that the answer or other suitable response will be presented to the payee during a not-yet-played or future portion of the interactive media content, in which case the computer bot can pause the interactive media content, maintain a placeholder for the place in the interactive media content that was being presented when the interactive media content was paused, retrieve the relevant, not-yet-played or future portion of the interactive media content, play the relevant, not-yet-played or future portion of the interactive media content for the payor; return to the placeholder for the place in the interactive media content that was being presented when the interactive media content was paused, resume presentation of the interactive media content from that placeholder, and remove from the remaining interactive media content the future portion that was played out of turn in response to the payor's question.

In some embodiments, a payee may generate the original transactional document and transmit the original transactional document to a third party, such as the user of the apparatus 100, for markup of the transactional document and generation of the interactive media content associated with the transactional document. In some embodiments, the user of the apparatus 100 may then transmit the interactive media content associated with the transactional document back to the payee such that the payee can transmit the interactive media content directly to the payor. In other embodiments, the user of the apparatus 100 may transmit the interactive media content associated with the transactional document directly to the payor. In some embodiments, as described elsewhere herein, the interactive media content may constitute a large file, such as a file having a file size that is too large to be transmitted via typical communication channels to the payee. For example, an interactive media content file embedded with a plurality of additional animation features and transitional effects showing and explaining a multiple page transactional document in a personalized presentation can require larger than average file sizes. As such, in some embodiments, the payee or the user of the apparatus 100 may store the interactive media content associated with the transactional document at the apparatus 100, a component thereof, a separate server, network, or computing device, or the like, and then transmit to the payor a link or other suitable means for retrieving or viewing the interactive media content without having to transmit the interactive media content to the payor.

In some embodiments, the computer bot may comprise at least one of a messaging bot, an audio bot, a visual bot, an audio-visual bot, a holographic bot, an augmented reality bot, and a virtual reality bot. In some embodiments, the computer bot may be configured to receive commands from a user, viewer, or payor associated with the transactional document or a portion thereof in response to or during the presentation of the interactive media content. In some embodiments, a payor or the like may request that a payment of a certain amount be made to the payee, for instance on the desired or required remittance date or another date. In some embodiments, the computer bot may, in response to the request from the payor that a payment be made to the payee, connect to and retrieve or request information associated with past payments made by the payor to the payee or another paid entity, determine a method of payment (e.g., credit card, check, direct deposit, wire transfer, or the like) that was made in past payments and information associated with particular payment type(s) most used or readily accepted by the payee, and respond to the payor with a response (e.g., an audio-visual, graphical, textual, numerical, or the like) to the payor's payment request which includes an indication regarding the method of past payment accepted by the payee as well as a request for confirmation that the payor's requested payment should be made in accordance with the past payment accepted by the payee. In other words, in some embodiments, the computer bot might hear or receive, during the course of presentation of the interactive media content, a request (e.g., verbal request) from the payor that a payment in the full statement amount be made to the payee, in response to which the computer bot determines that a previous payment was made by the payor to the same payee using direct deposit from a bank account approximately one month prior, the computer bot may determine based upon actual confirmation or based upon a probability that the bank account information is valid for purposes of the currently requested payment, respond to the payor by asking whether the method of payment of the previous payment is acceptable for making the currently requested payment, and, upon confirmation that the previous payment method is acceptable, communicate or cause communication authentication for the full statement amount to be debited from the payor's bank account on the agreed-upon payment date and credited to an account associated with the payee. In some embodiments, additional security measures may be taken wherein the computer bot, device running the computer bot, or third party system may request a password, pin number, fingerprint, iris scan, facial recognition, vocal print, an associated telephone number, a full or partial social security number, an account number, two-factor authentication via a cell phone call, application email, SMS message, public key infrastructure, combinations thereof, or the like.

In some embodiments, the interactive media content comprises video content that is one or more of: associated with at least a portion of the subject matter drawn directly from the transactional document, extracted from the metadata associated with the markups, retrieved from one or more other internal sources, retrieved from one or more other external source, and the like. In some embodiments, the interactive media content comprises audio content that is one or more of: associated with at least a portion of the subject matter drawn directly from the transactional document, extracted from the metadata associated with the markups, retrieved from one or more other internal sources, retrieved from one or more other external source, and the like. In some embodiments, the interactive media content comprises textual content that is one or more of: associated with at least a portion of the subject matter drawn directly from the transactional document, extracted from the metadata associated with the markups, retrieved from one or more other internal sources, retrieved from one or more other external source, and the like. In some embodiments, the interactive media content comprises graphical content that is one or more of: associated with at least a portion of the subject matter drawn directly from the transactional document, extracted from the metadata associated with the markups, retrieved from one or more other internal sources, retrieved from one or more other external source, and the like. In some embodiments, the interactive media content comprises verbal, audible, or aural content that is one or more of: associated with at least a portion of the subject matter drawn directly from the transactional document, extracted from the metadata associated with the markups, retrieved from one or more other internal sources, retrieved from one or more other external source, and the like. In some embodiments, the interactive media content comprises tactile content that is one or more of: associated with at least a portion of the subject matter drawn directly from the transactional document, extracted from the metadata associated with the markups, retrieved from one or more other internal sources, retrieved from one or more other external source, and the like. In some embodiments, the interactive media content comprises visual content that is one or more of: associated with at least a portion of the subject matter drawn directly from the transactional document, extracted from the metadata associated with the markups, retrieved from one or more other internal sources, retrieved from one or more other external source, and the like.

In some embodiments, the interactive media content can comprise audible or verbal content that is at least one of: associated with at least a portion of the subject matter drawn directly from the transactional document, from the metadata associated with the markups, and from some other internal or external source. In some embodiments, the interactive media content can also comprise visual content not associated with the subject matter drawn from or associated with the transactional document or the markups thereof. In some embodiments, the interactive media content can comprise video content of an avatar or other suitable visage or rendering indicative of or evocative of a human. In some embodiments, the avatar or the like may be presented in conjunction with audible or verbal media content and the avatar may be controlled such that the user, viewer, or payor perceives that the audible or verbal media content is originating from the avatar, such as by moving the avatar's mouth or adding speech bubbles originating at or near the avatar's mouth, or by any other suitable means. In some embodiments, the video content can comprise graphical, textural, or illustrative content not in a form meant to suggest or evoke a human form, such as a graph (e.g., bar or line graph, pie chart, etc.) associated with payments made during previous payment periods, a textual or numerical representation of an amount owed by the payor to the payee, a map associated with a location of the payor's property or payee's office location, or the like.

While the transactional document and associated interactive media content are generally discussed in the context of a bill, the interactive document and associated interactive media content can also comprise one or more from among: an electronic account statement, a receipt, an insurance policy, a contract, government documents, federal tax returns, state tax returns, a response from a governmental agency to a tax return submitted, parking tickets, moving violation summons, court documents, jury duty messages, court summons, late payment notices, utility shut-off notices, eviction notices, warranties, last will and testament documents, living trusts, government-issued identifications, terms of service, instructional manuals, assembly instructions, maintenance records, standard operating procedures, safety protocols, and the like.

In some embodiments, the interactive media content can be accessed via a link, such as a hyperlink, hypertext, anchor link, anchor text, inline links, a web spider, a transclusion, a hypertext mark-up language (HTML) link, an XLink, a permalink, a fat link, a one-to-many link, an extended link, a multi-tailed link, or the like. In some embodiments, the interactive media content can be accessed via an application, such as in response to a 'push' notification from the application to the payor. In some embodiments, the interactive media content can be made available within an application or on a device running the application without the need for accessing external links. In some embodiments, such a link to the interactive media content can be transmitted to the user, viewer, or payor via one or more of: electronic mail (email), a short message service (SMS) text, a messaging application, a mobile application, and a URL printed on a hard copy of a communication to the user, viewer, or payor. Likewise, in some embodiments, a link to the interactive media content or the interactive media content itself can be provided to the user, viewer, or payor by way of a website associated with the payee or a third-party website suitable for secure presentation of the link to the interactive media content or the interactive media content itself. In some embodiments, the interactive media content or a link thereto may be communicated to the user, viewer, or payor by way of an artificial intelligence assistant, wearable device, smart phone, smart home device, or other suitable smart devices connected to other devices or networks via a wireless protocol such as Bluetooth, NFC, Wi-Fi, Li-Fi, 3G, 4G, 5G, or the like. Such smart devices can comprise any form factor, including but not limited to: tabs, pads, boards, smartdust, transparent displays, organic light-emitting diode displays, tangible user interfaces, smart watches, smart exercise bands, any combination thereof, and the like. As described herein, "smart" and "intelligent" devices are characterized by one or more of: they are connected to a network or another device, the hardware is local, they are autonomous in terms of service execution, they present ubiquitous computing properties and computing capabilities, and they rely upon remote external service access and execution. Some examples of smart or intelligent devices by which the interactive media content may be presented or transmitted to or accessed by the user, viewer, or payor include but are not limited to the Amazon Echo®, Amazon Echo Show®, Amazon Echo Spot®, Wink Hub®, Logitech Harmony Elite®, Google Home®, Facebook Portal®, Lenovo® Smart Display, and the like. Such smart or intelligent devices allow for various modes of user input including touch input, voice commands, gesture recognition, remote controls (e.g., remote controller, tethered smart device, etc.). Such smart or intelligent devices provide the additional benefit of allowing ease of access to impaired device users (e.g., blind, deaf, paraplegic, quadriplegic, arthritic, elderly, a combination thereof, or the like). In some embodiments, the user, viewer, or payor may indicate one or more of: preferences, smart device settings, application settings, the manner, venue, or form in which the interactive media content associated with the transactional document is presented (e.g., audio, video, etc.) and delivered (e.g., email, SMS message, etc., and the like. In some embodiments, the user may indicate that they want the interactive media content to be presented via audio presentation only, via video presentation only, or via a combined audio-visual presentation.

In some embodiments, when the user, viewer, or payee receives, for instance, an email or other such message related to the interactive media content associated with the transactional document, the message may contain the interactive media content embedded in the message or attached to the message. As such, in some embodiments, when the user, viewer, or payee indicates they would like to access and view the interactive media content, a temporary or embedded application, or an application housed on the user device or other such device that received the message may be caused to access and present the interactive media content to the user, viewer, or payor. In some embodiments, the user, viewer, or payor may indicate that they would like to access and view the interactive media content by way of a gesture, such as a translational gesture, a vocal command, a touch input to a touch-sensitive display or the like, or by any other suitable means.

In some embodiments, receiving a command, question, comment, or other such interaction from the user, viewer, or payor to the application presenting the interactive media content may result in the application or device running the application determining one or more of: that the question is outside the bounds of the type of question the application is able to answer, that the interaction is generally unintelligible or not understandable, that one or more pieces of information or data required to provide a fulsome response to the interaction is missing and non-retrievable, and that an answer or service cannot be provided or carried out based upon the interaction. In such instances, the application or device running the application may communicate to the user, viewer, or payor that a fulsome answer cannot be provided or that the service cannot be executed at this time, and the application or device may escalate the unanswered question or unexecuted service to the payee or a third party for further intervention or action. In some embodiments, the escalated unanswered question or unexecuted service can be transferred to the payee or a third party via one or more of email, SMS message, video recording of the unintelligible request, audio recording of the unintelligible request, a combination thereof, and the like. In some embodiments, the escalated unanswered question or unexecuted service can result in the application or device running the application to initiate a real time communication (e.g., telephone communication, instant messaging service, etc.) with one or more of: the payee, a third party, and a representative thereof. The real time communication can be automatically initiated by the application or device running the application after a preset number of failed attempts of the unintelligible request. Additionally or alternatively, the real time communication can be initiated by the application or device running the application at the request of the device user via a prompted (i.e., the application or device running the application asks the user of the device if they would like to speak with a representative) or unprompted input command. In some embodiments, the application or device can return to a previous command prompt, after receiving an unanswerable question or inexecutable service request, to allow the user of the device to initiate the same, similar, or unrelated question or executable service.

For many embodiments, such as when the transactional document is a bill or other secure or private document, or when a requestable service during interaction with the user, viewer, or payor could result in access to private or secure information or the making of a payment, authentication by the user, viewer, or payor may be required. As such, in some embodiments, the application may require, for example before initiating a payment from the payor to the payee, authentication indicia from the user, viewer, or payor. In some embodiments, the application or device running the application may request a password, pin number, fingerprint, palmprint, iris scan, facial recognition, vocal print or voice recognition, an associated telephone number, a social security number, an account number, two-factor authentication via a cell phone call, email, SMS message, public key infrastructure, radio-frequency identification (RFID) reader, integrated circuit chip (ICC) card reader, combinations thereof, or the like.

In some embodiments, during interaction with the user, viewer, or payee, a transaction, such as a financial transaction, may be authorized by an authenticated payee, in which the application presenting the interactive media content or the device running the application may directly initiate payment or may request authorization from a payment processor, bank, or the like by providing the authentication information and payment information and then waiting for the payment processor, bank, or the like to carry out the financial transaction between the payor and the payee. In some embodiments, depending on the time it takes to carry out the transaction, confirmation of completion of the transaction may be presented in any suitable manner to the user, viewer, or payee, such as audible/verbal confirmation, textual confirmation, or the like, as part of or subsequent to the interactive media content. In some embodiments, if it takes longer to carry out the transaction, such as if authentication is required by a third-party or a counter-signature is required on a document by the other party, for instance, then confirmation of the initiation of the transaction may be presented in any suitable manner to the user, viewer, or payee, such as audible/verbal confirmation, textual confirmation, or the like, as part of or subsequent to the interactive media content. In some instances, such as when a blind request must be made to a third party for initiation of a transaction, such as a payment or counter-signature of a document, for instance, only confirmation of transmission of a request for the transaction may be presented in any suitable manner to the user, viewer, or payee, such as audible/verbal confirmation, textual confirmation, or the like, as part of or subsequent to the interactive media content.

In some embodiments, such as when an interaction related to a transactional document or an associated transaction should or must be persistent, the interactive media content may be recorded, along with any suitable recordation of the user, viewer, or payor and their interactions with the application before, during, or after presentation of the interactive media content. As such, for transactions, such as presentation of insurance terms and verbal agreement to said terms, verbal authorization to process a financial transaction, or the like, an audio, video, or audio-video recording of the presentation of the interactive media content, the payor, and any interaction can be recorded and stored. This can be especially important in terms of legal and governmental requirements for proof of such authorizations, agreements, acknowledgements, and the like. Proof of authorization, or the like, can include, but is not limited to, video of the payor verbally agreeing to the transaction. In some embodiments, the payor may read from a script prompted by the interactive media content application confirming the terms and amounts, or other key information, of the financial transaction to be authorized.

In an instance in which only a part of a transaction, such as initiation or request for payment processing but not the full payment processing, can be carried out during the authenticated session or during presentation of the interactive media content, the application or a device running the application, a third party, the payee, a payment processor, or the like can confirm finalization of the transaction at a later time through any suitable means, such as via SMS text message, via email, or via a live or automated telephone call. Additionally or alternatively, copies of transactional documents or additional documents generated from, or as the result of interaction with, the interactive media content can be stored or communicated to the device user in whole, in part, or in combination through the aforementioned communication methods.

In some embodiments, such as when a transaction, such as a financial transaction, is initiated or authorized during the course of presenting the interactive media content to the user, viewer, or payor, the application or the device running the application that is presenting the interactive media content may instead present advertising, such as while the transaction is being carried out or while waiting for confirmation of completion of a transaction from another party. In some embodiments, the advertising can be audio advertising, visual advertising, audio-visual advertising, or the like. In some embodiments, the advertising may also be interactive in that the user, viewer, or payor may indicate a desire to learn more about a product, via any suitable means for indication or via any suitable indicia of such a desire, and the application or the device running the application or another suitable device may either present other media content relevant to the advertisement to the user, viewer, or payor. In some embodiments, in an instance in which the application or the device running the application determines the user, viewer, or payor is interested in learning more about the advertisement, the application or device running the application may redirect the user, viewer, or payor to other content, such as a website, for instance, related to the advertisement. In some embodiments, in an instance in which the application or the device running the application determines the user, viewer, or payor is interested in learning more about the advertisement, the application or device running the application may wait until the interactive media content and primary interaction is completed and then present the other media content relevant to the advertisement to the user, viewer, or payor or redirect the user, viewer, or payor to the website, for instance, related to the advertisement. The present disclosure contemplates further embodiments wherein business relationships between the advertiser, payor, payee, a combination thereof, or other third party can result in additional benefits (e.g., discounts, free trials, promotional points, etc.) to a payor, or viewer, who interacts with the presented advertisement content. For example, a payor may receive a discount on their billing statement as a result of watching a full advertisement or completing a related survey prior to paying the amount owed. The aforementioned additional benefits can be provided by the payee, advertiser, or other third party through direct communication with the payor, or viewer, through the interactive media content application, through the payor's account with the payee, email code, or other transactional formats.

By way of example only, an embodiment may provide a method or approach for presenting an interactive media content based on a transactional document, such as a bill, is illustrated in FIG. 3. As illustrated, the method or approach may include the payee providing a transactional document with markups and metadata, such as described elsewhere herein, to an apparatus (such as the apparatus 100), a cloud service provider, a system (such as the system 200), or the like. The apparatus, cloud service provider, or system may then generate an interactive bill based upon the transactional document and associated markups and metadata, and to then either transmit the interactive bill, a link to the interactive bill, or other such means for accessing, receiving, or engaging with the interactive bill to the payor associated with the transactional document. In some embodiments, the payor can be the payor device, user equipment, or the like as disclosed elsewhere herein.

In some embodiments, the payor then transmits a connection establishment handshake or the like to the apparatus, cloud service, or system, or otherwise establishes a connection to the same. The apparatus, cloud service, or system then provides the video stream of the interactive video bill to the payor based on the transactional document, markups of the transactional document, and metadata associated with the transactional document. In some embodiments, the payor may transmit a verbal question or comment related to the transactional document to the apparatus, cloud service, or system. Additionally or alternatively, other communications other than verbal communications can be transmitted from the payor or payor equipment to the apparatus, cloud service, or system. The apparatus, cloud service, or system may then relay the question or comment to the payee or payee hardware or associated systems.

The payee, in response to receiving the question or comment from the payor, may transmit information related to a response to the question or comment provided by the payor to the apparatus, cloud service, or system. In some embodiments, information related to at least some of the likely, possible, or frequent questions or comments from payors may be initially transmitted from the payee to the apparatus, cloud service, or system such that at least some payor questions or comments need not be relayed to the payee. In some embodiments, the apparatus, cloud service, or system may then transmit an additional or edited interactive video stream related to the response to the question or comment. In some embodiments, the current video stream may be paused in response to the payor asking a question or relaying a comment, and the additional or edited interactive video stream may be presented to the payor instead of the current video stream, and upon finishing presentation of the additional or edited interactive video stream to the payor, the current video stream may be resumed from the same or a later point in the interactive video stream. In response to the payor providing authorization to the apparatus, cloud service, or system for a payment to be made in response to the interactive video bill. The apparatus, cloud, or system can then relay authorization to make the payment to the payee, a payment processing entity, the payor's financial institution, or the like.

Referring now to FIG. 4, a method 300 for presenting an interactive media content related to a transactional document is shown. In some embodiments, the method 300 can be carried out by any suitable means, such as the apparatus 100 described above or a similar device or system. In some embodiments, for instance, computer program instructions, such as the computer program instructions 110 described above may be used, such as by the computing device 102, to carry out the method 300 described herein. As illustrated in FIG. 4, the method 300 can comprise receiving in digital form a textual bill associated with a user, at 301. In some embodiments, the method 300 can further comprise determining, using a textual language processor, a plurality of content fields from the textual bill, at 302. In some embodiments, the method 300 can further comprise assigning a plurality of markups and metadata to the plurality of content fields, each markup indicating a particular portion of the textual bill associated with a respective content field, said metadata for each respective content field comprising information indicative of a content type, a content group, a unique identifier associated with the respective content field, a processing designation associated with said content field, or a security designation, at 303. In some embodiments, the method 300 can further comprise preparing, using said plurality of content fields, said plurality of markups, and said metadata, an audio-visual presentation associated with said textual bill, at 304. In some embodiments, the method 300 can, optionally, further comprise receiving from one or more of: verbal, natural language textual, and visual-manual communication related to said audio-visual presentation, at 305. In some embodiments, the method 300 can, optionally, further comprise, in response to said receiving, initiating at least one of: a verbal language processing engine, a natural language processing engine, and an audio-visual language processing engine, at 306.

Referring now to FIG. 5, a method 400 for preparing and presenting an interactive media content related to a transactional document is shown. In some embodiments, the method 400 can be carried out by any suitable means, such as the apparatus 100 described above or a similar device or system. In some embodiments, for instance, computer program instructions, such as the computer program instructions 110 described above may be used, such as by the computing device 102, to carry out the method 400 described herein. As illustrated in FIG. 5, the method 400 can comprise receiving transactional information related to said user, said transactional information comprising one or more markups corresponding to one or more fields of said transactional information, at 401. In some embodiments, the method 400 can further comprise providing to said user an audio-visual presentation, said audio-visual presentation comprising an audio representation of said one or more field of said transactional information corresponding to said one or more markups and a video representation, at 402. In some embodiments, the method 400 can, optionally, further comprise receiving, from said user, one or more of: verbal, natural language textual, and visual-manual communication related to said audio-visual presentation, at 403. In some embodiments, the method 400 can, optionally, further comprise in response to said receiving, initiating at least one of: a verbal language processing engine, a natural language processing engine, and an audio-visual language processing engine, at 404. In some embodiments, the method 400 can, optionally, further comprise determining a response to said one or more of: a verbal, a natural language textual, and a visual-manual communication related to said audio-visual presentation, at 405. In some embodiments, the method 400 can, optionally, further comprise presenting a further audio-visual presentation indicative of said response to said one or more of: a verbal, a natural language textual, and a visual-manual communication, at 406.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Referring now to FIG. 6, a user interactive display 500 is illustrated for viewing and interacting with an interactive bill or the like. As illustrated in FIG. 6, a user may be presented, using the user interactive display 500, with an interactive personification, avatar, archetype, illustration, or the like, that is intended to mimic interaction with a real person. In some embodiments, the user interactive display 500 may be configured to present a universal personification can be used with each and every user. In some embodiments, user interactive display 500 can be configured such that the universal personification can change over time. In some embodiments, the user interactive display 500 can be configured to present a personification that changes between users. In some embodiments, the user interactive display 500 can be configured to present a personification that changes between users based upon user-provided instructions or preferences. In some embodiments, the user interactive display 500 can be configured to present a personification that changes between users based upon one or more user-provided characteristic(s) or one or more detected user characteristic(s), such as one or more of: sex, gender, age, race, hair style, clothing style, and other user characteristics.

In some embodiments, the user interactive display can be configured to display a personification by itself on the user interactive display 500. Additionally or alternatively, the user interactive display 500 can be configured to present or display the personification alongside or contemporaneously/simultaneously with other elements, features, figures, or the like, such as graphs, text, headings, pictures, videos, and the like. As illustrated in FIG. 6, for instance, the user interactive display 500 can present to the user/payor a visual representation of the bill, contract, or other transactional document as an inset image or illustration. In some embodiments, the user interactive display 500 can be controlled such that the personification appears to present and control display of the illustration or representation of the transactional document or the like on the user interactive display 500. In some embodiments, the user interactive display 500 can be controlled or configured to be controlled so as to appear to the user/payor that the personification is creating and presenting other graphics based upon information or data contained or presented in the transactional document. For instance, as illustrated in FIG. 6, a graphical representation of data from the transactional document can be extracted from the trans-actional document and presented on the user interactive display 500.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method comprising:

receiving, from a user device associated with a user, a first request for information about a bill issued to the user by a billing entity, wherein the first request for information comprises at least: information about the user, information about the billing entity, information about the bill issued to the user by the billing entity, and one or more first user questions;

in an instance in which the first request for information about the bill does not comprise a digital version of the bill, requesting the digital version of the bill from the user device or a billing entity device associated with the billing entity and, upon receiving the digital version of the bill from the user device or the billing entity device, storing the digital version of the bill in a database associated with the user;

in an instance in which the first request for information about the bill comprises the digital version of the bill, extracting the digital version of the bill from the first request for information and storing the digital version of the bill in the database associated with the user;

programmatically extracting a plurality of bill content elements from the digital version of the bill issued to the user by the billing entity and storing the plurality of bill content elements in the database associated with the user;

programmatically generating a plurality of markups associated with each of the plurality of bill content elements extracted from the digital version of the bill and storing the plurality of markups and a mapping of the plurality of markups to the plurality of bill content elements in the database associated with the user, wherein at least one of the plurality of markups assigned to each of the plurality of bill content elements indicate a particular portion of the digital version of the bill from which the respective bill content element of the plurality of bill content elements was extracted;

programmatically generating at least one metadata item associated with each of the plurality of markups and storing the at least one metadata item associated with each of the plurality of markups in the database associated with the user, wherein the at least one metadata item comprises at least one tag identifying a content type of the markup to which the at least one metadata item is assigned;

determining, based upon the one or more first user questions in the first request for information about the bill issued to the user by the billing entity and the at least one metadata item associated with each of the plurality of markups, one or more bill content elements from among the plurality of bill content elements extracted from the digital version of the bill that contain information responsive to the one or more first user questions;

generating, based at least upon the one or more bill content elements from among the plurality of bill content elements extracted from the digital version of the bill that contain information responsive to the one or more first user questions, a first audio-visual presentation in an audio-visual format, wherein the first audio-visual presentation comprises the information from the one or more bill content elements, from among the plurality of bill content elements, that is responsive to the one or more first user questions;

providing, to the user device associated with the user, the first audio-visual presentation for presentation to the user via the user device;

receiving, from the user device, in response to a user interaction with the user device following the presentation of the first audio-visual presentation to the user, a second request for information about the bill issued to the user by the billing entity, the second request for information comprising one or more second user questions not answered by the first audio-visual presentation;

determining, based upon the one or more second user questions in the second request for information about the bill issued to the user by the billing entity and the at least one metadata item associated with each of the plurality of markups, that the one or more second user questions are unanswerable because the plurality of bill content elements extracted from the digital version of the bill do not contain information responsive to the one or more second user questions;

sending to the billing entity device associated with the billing entity, a missing information request for additional information to answer the one or more second user questions;

receiving, from the billing entity device, in response to the missing information request, one or more items of missing information and storing the one or more items of missing information in the database associated with the user;

programmatically generating a second audio-visual presentation comprising information indicative of the one or more items of missing information; and providing, to the user device, the second audio-visual presentation for presentation to the user via the user device.

2. The computer-implemented method of claim 1, wherein the plurality of bill content elements comprise one or more of: a user identifier, a user account identifier, a billing entity identifier, a bill amount, a bill date, a bill memo, or a bill description.

3. The computer-implemented method of claim 1, wherein the generating the first audio-visual presentation further comprises compiling, according to a predefined or dynamically defined order or structure, relevant subject matter from the plurality of bill content elements extracted from the digital version of the bill.

4. The computer-implemented method of claim 1, wherein the providing the first audio-visual presentation to the user device further comprises providing, with the first audio-visual presentation, a request for the user device to present the first audio-visual presentation to the user.

5. The computer-implemented method of claim 1, further comprising:

in an instance in which the one or more second user questions are answerable based upon additional information extracted from the plurality of bill content elements, the plurality of markups associated with each of the plurality of bill content elements, and at least one metadata item associated with each of the plurality of markups, generating the second audio-visual presentation based upon the additional information extracted from the plurality of bill content elements, the plurality of markups, and/or the one or more metadata items.

6. The computer-implemented method of claim 1, further comprising:

determining, based upon the second request for information, that the user is requesting initiation of a payment between the user and the billing entity in response to the bill issued to the user by the billing entity;

determining, from the plurality of bill content elements extracted from the digital version of the bill, a bill amount associated with the bill; and generating a payment command message indicative of a command to initiate the payment of the bill amount from a user account associated with the user to an account associated with the billing entity.

7. The computer-implemented method of claim 6, further comprising:

providing the payment command message to at least one of: the billing entity device, the user device, a payment processing device, or a bank device.

8. An apparatus comprising:

at least one processor; and at least one memory storing instructions thereon that, when executed by the at least one processor, cause the apparatus to perform at least:

receiving, from a user device associated with a user, a first request for information about a bill issued to the user by a billing entity, wherein the first request for information comprises at least: information about the user, information about the billing entity, information about the bill issued to the user by the billing entity, and one or more first user questions;

in an instance in which the first request for information about the bill does not comprise a digital version of the bill, requesting the digital version of the bill from the user device or a billing entity device associated with the billing entity and, upon receiving the digital version of the bill from the user device or the billing entity device, storing the digital version of the bill in a database associated with the user;

in an instance in which the first request for information about the bill comprises the digital version of the bill, extracting the digital version of the bill from the first request for information and storing the digital version of the bill in the database associated with the user;

extracting a plurality of bill content elements from the digital version of the bill issued to the user by the billing entity and storing the plurality of bill content elements in the database associated with the user;

generating a plurality of markups associated with each of the plurality of bill content elements extracted from the digital version of the bill and storing the plurality of markups and a mapping of the plurality of markups to the plurality of bill content elements in the database associated with the user, wherein at least one of the plurality of markups assigned to each of the plurality of bill content elements indicates a particular portion of the digital version of the bill from which the respective bill content element of the plurality of bill content elements was extracted;

generating at least one metadata item associated with each of the plurality of markups and storing the at least one metadata item associated with each of the plurality of markups in the database associated with the user, wherein the at least one metadata item comprises at least one tag identifying a content type of the markup to which the at least one metadata item is assigned;

determining, based upon the one or more first user questions in the first request for information about the bill issued to the user by the billing entity and the at least one metadata item associated with each of the plurality of markups, one or more bill content elements from among the plurality of bill content elements extracted from the digital version of the bill that contain information responsive to the one or more first user questions;

generating, based at least upon the one or more bill content elements from among the plurality of bill content elements extracted from the digital version of the bill that contain information responsive to the one or more first user questions, a first audio-visual presentation in an audio-visual format, wherein the first audio-visual presentation comprises the information from the one or more bill content elements, from among the plurality of bill content elements, that is responsive to the one or more first user questions;

providing, to the user device associated with the user, the first audio-visual presentation for presentation to the user via the user device;

receiving, from the user device, in response to a user interaction with the user device following the presentation of the first audio-visual presentation to the user via the user device, a second request for information about the bill issued to the user by the billing entity, wherein the second request for information comprises one or more second user questions not answered by to the first audio-visual presentation;

determining, based upon the one or more second user questions in the second request for information about the bill issued to the user by the billing entity and the at least one metadata item associated with each of the plurality of markups, that the one or more second user questions are unanswerable because the plurality of bill content elements extracted from the digital version of the bill do not contain information responsive to the one or more second user questions;

sending, to the billing entity device associated with the billing entity, a missing information request for additional information to answer the one or more second user questions;

receiving, from the billing entity device, in response to the missing information request, one or more items of missing information and storing the one or more items of missing information in the database associated with the user;

generating a second audio-visual presentation comprising information indicative of the one or more items of missing information; and providing, to the user device, the second audio-visual presentation for presentation to the user via the user device.

9. The apparatus of claim 8, wherein the plurality of bill content elements comprise one or more of: a user identifier, a user account identifier, a billing entity identifier, a bill amount, a bill date, a bill memo, or a bill description, and wherein the first audio-visual presentation associated with the digital version of the bill is generated by compiling, according to a predefined or dynamically defined order or structure, relevant subject matter from the plurality of bill content elements extracted from the digital version of the bill.

10. The apparatus of claim 8, wherein the instructions stored on the at least one memory, when executed by the at least one processor, further cause the apparatus to perform at least:

in an instance in which the one or more second user questions are answerable based upon the plurality of bill content elements, the plurality of markups associated with each of the plurality of bill content elements, and the at least one metadata item associated with each of the plurality of markups, generating the second audio-visual presentation based at least upon additional information extracted from the plurality of bill content elements.

11. The apparatus of claim 8, wherein the instructions stored on the at least one memory, when executed by the at least one processor, further cause the apparatus to perform at least:

determining, based upon the second user request received in response to the presentation of the first audio-visual presentation to the user via the user device, that the user is requesting initiation of a payment between the user and the billing entity in response to the bill issued to the user by the billing entity;

determining, from the plurality of bill content elements extracted from the digital version of the bill, a bill amount associated with the bill; and generating a payment command message indicative of a command to initiate the payment of the bill amount from a user account associated with the user to an account associated with the billing entity.

12. The apparatus of claim 11, wherein the instructions stored on the at least one memory, when executed by the at least one processor, further cause the apparatus to perform at least:

providing the payment command message to at least one of: the billing entity device, the user device, a payment processing device, or a bank device.

13. The apparatus of claim 8, wherein the at least one processor comprises at least one of:

a textual language processor configured to process and analyze textual language;

an audio-visual language processor configured to process, linguistically analyze, and generate verbal language, aural language, data indicative of recorded verbal language, data indicative of recorded aural language, visual textual information, visual numerical information, video, and images;

a verbal language processor configured to process and linguistically analyze verbal language, aural language, data indicative of recorded verbal language, and data indicative of recorded aural language; or a natural language processor configured to process and linguistically analyze verbal language, aural language, data indicative of recorded verbal language, and data indicative of recorded aural language.

14. The apparatus of claim 13, wherein the at least one processor is configured to perform at least one of: optical character recognition, speech recognition, speech segmentation, text-to-speech processing, word segmentation, tokenization, knowledge extraction, neural network analysis, machine learning analysis, probabilistic analysis and decision making, lemmatization, morphological segmentation, part-of-speech tagging, stemming, statistical analysis and semantic extrapolation, grammar induction, sentence breaking, sentence boundary disambiguation, parsing, stochastic grammar analysis, lexical semantic analysis, distribution semantic analysis, named entry recognition, sentiment analysis, terminology extraction, word sense disambiguation, relationship extraction, semantic parsing, semantic role labelling, coreference resolution, discourse analysis, implicit semantic role labelling, textual entailment recognition, topic segmentation and recognition, automatic summarization, machine translation, natural language understanding, natural language generation, or question answering.

15. The apparatus of claim 13, wherein the instructions stored on the at least one memory, when executed by the at least one processor, further cause the apparatus to perform at least:

in response to receiving the first user request from the user device, initiating at least one of the verbal language processor, the natural language processor, or the audio-visual language processor.

16. A non-transitory computer-readable storage medium comprising instructions stored thereon that, when executed by a computing device, cause the computing device to perform at least the following:

receiving, from a user device associated with a user, a first request for information about a bill issued to the user by a billing entity, wherein the first request for information comprises at least: information about the user, information about the billing entity, information about the bill issued to the user by the billing entity, and one or more first user questions;

in an instance in which the first request for information about the bill does not comprise a digital version of the bill, requesting the digital version of the bill from the user device or a billing entity device associated with the billing entity and, upon receiving the digital version of the bill from the user device or the billing entity device, storing the digital version of the bill in a database associated with the user;

in an instance in which the first request for information about the bill comprises the digital version of the bill, extracting the digital version of the bill from the first request for information and storing the digital version of the bill in the database associated with the user;

programmatically extracting a plurality of bill content elements from the digital version of the bill issued to the user by the billing entity and storing the plurality of bill content elements in the database associated with the user;

programmatically generating a plurality of markups associated with each of the plurality of bill content elements extracted from the digital version of the bill and storing the plurality of markups and a mapping of the plurality of markups to the plurality of bill content elements in the database associated with the user, wherein at least one of the plurality of markups assigned to each of the plurality of bill content elements indicate a particular portion of the digital version of the bill from which the respective bill content element of the plurality of bill content elements was extracted;

programmatically generating at least one metadata item associated with each of the plurality of markups and storing the at least one metadata item associated with each of the plurality of markups in the database associated with the user, wherein the at least one metadata item comprises at least one tag identifying a content type of the respective-markup to which the at least one metadata item is assigned;

determining, based upon the one or more first user questions in the first request for information about the bill issued to the user by the billing entity and the at least one metadata item associated with each of the plurality of markups, one or more bill content elements from among the plurality of bill content elements extracted from the digital version of the bill that contain information responsive to the one or more first user questions;

generating, based at least upon the one or more bill content elements from among the plurality of bill content elements extracted from the digital version of the bill that contain information responsive to the one or more first user questions, a first audio-visual presentation presenting in an audio-visual format, wherein the first audio-visual presentation comprises the information from the one or more bill content elements, from among the plurality of bill content elements, that is responsive to the one or more first user questions; digital bill in an audio visual format;

providing, to the user device associated with the user, the first audio-visual presentation-associated with the digital bill for presentation of the first audio visual presentation to the user via the user device;

receiving, from the user device, a user request in response to a user interaction with the user device following the presentation of the first audio-visual presentation to the user-associated with the digital bill, a second request for information about the bill issued to the user by the billing entity, the second request for information comprising one or more second the user request comprising a user questions not answered by related to the first audio-visual presentation associated with the digital bill;

determining, based upon the one or more second user questions in the second request for information about the bill issued to the user by the billing entity and the at least one metadata item associated with each of the plurality of markups, that the one or more second user questions are unanswerable because the plurality of bill content elements extracted from the digital version of the bill do not contain information responsive to the one or more second user questions;

sending, to the billing entity device associated with the billing entity, a missing information request for additional information to answer the one or more second user questions;

receiving, from the billing entity device, in response to the missing information request, one or more items of missing information and storing the one or more items of missing information in the database associated with the user;

programmatically generating a second audio-visual presentation comprising information indicative of the one or more items of missing information; and providing, to the user device, the second audio-visual presentation for presentation to the user via the user device.

17. The non-transitory computer-readable-computer readable storage medium of claim 16, wherein the instructions stored thereon, when executed by the computing device, further cause the computing device to perform:

in an instance in which the one or more second user questions are answerable based upon the plurality of bill content elements, the plurality of markups associated with each of the plurality of bill control elements, and the at least one metadata item associated with each of the plurality of markups, generating the second audio-visual presentation comprising the one or more second answers to the one or more second user questions based upon additional information extracted from the plurality of bill content elements.

18. The non-transitory computer-readable storage medium of claim 16, wherein the instructions stored thereon, when executed by the computing device, further cause the computing device to perform:

determining, based upon the second user request, that the user is requesting initiation of a payment between the user and the billing entity in response to the bill issued to the user by the billing entity;

determining, from the plurality of bill content elements extracted from the digital version of the bill, a bill amount associated with the digital bill; and generating a payment command message indicative of a command to initiate the payment of the bill amount from a user account associated with the user to an account associated with the billing entity.

19. The non-transitory computer-readable storage medium of claim 16, wherein the instructions stored thereon, when executed by the computing device, further cause the computing device to perform:

providing the payment command message to at least one of: the billing entity device, the user device, a payment processing device, or a bank device.

20. The non-transitory computer-readable storage medium of claim 19, wherein the instructions stored thereon, when executed by the at least one processor, further cause the computing device to perform:

in response to receiving, from the user device, the first request for information, initiating at least one of the verbal language processor, the natural language processor, or the audio-visual language processor.

* * * * *